(12) United States Patent
Bonalle et al.

(10) Patent No.: US 8,429,041 B2
(45) Date of Patent: Apr. 23, 2013

(54) SYSTEMS AND METHODS FOR MANAGING ACCOUNT INFORMATION LIFECYCLES

(75) Inventors: David Bonalle, New Rochelle, NY (US); Michal Bliman, Matawan, NJ (US); Peter D. Saunders, Salt Lake City, UT (US); John Robert Williamson, Jersey City, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 2156 days.

(21) Appl. No.: 10/435,420

(22) Filed: May 9, 2003

(65) Prior Publication Data

US 2004/0225602 A1     Nov. 11, 2004

(51) Int. Cl.
*G06Q 40/00* (2012.01)

(52) U.S. Cl.
USPC .......................................................... 705/35

(58) Field of Classification Search ............... 705/35–40
See application file for complete search history.

(56) References Cited

U.S. PATENT DOCUMENTS

| | | |
|---|---|---|
| 4,303,904 A | 12/1981 | Chasek |
| 4,443,027 A | 4/1984 | McNeely et al. |
| 4,450,535 A | 5/1984 | de Pommery et al. |
| 4,475,308 A | 10/1984 | Heise et al. |
| 4,583,766 A | 4/1986 | Wessel |
| 4,639,765 A | 1/1987 | D'Hont |
| 4,672,021 A | 6/1987 | Blumel et al. |
| 4,700,055 A | 10/1987 | Kashkashian, Jr. |

(Continued)

FOREIGN PATENT DOCUMENTS

| | | |
|---|---|---|
| CH | 689070 A5 | 8/1988 |
| EP | 0 358 525 A2 | 3/1990 |

(Continued)

OTHER PUBLICATIONS http://www.semiconductors.philips.com/news/content/file_878.html, Apr. 7, 2003.

(Continued)

*Primary Examiner* — Thomas M Hammond, III
(74) *Attorney, Agent, or Firm* — Snell & Wilmer L.L.P.

(57) ABSTRACT

Systems and methods are configured to manage data sets associated with a financial transaction instrument. For example, a method is provided for facilitating the management of data sets on a financial transaction instrument that is issued by an issuer. The method includes the steps of: adding, by a first owner, a first data set to the financial transaction instrument, wherein the first data set is owned by a first owner; adding, by a second owner, a second data set to the financial transaction instrument, wherein the second data set is owned by a second owner; and storing the first data set and the second data set on the financial transaction instrument. The first and second data sets may each be stored as a Block of Binary. Furthermore, the first data set may be updated and/or deleted from the financial transaction instrument. In another example, a financial transaction instrument comprises a data set management system for facilitating the management of more than one data set, the financial transaction instrument comprising at least one data storage area configured to store a first data set and a second data set. The first and second data sets are associated with first and second owners, respectively, and are configured to be stored by their owners independent of each other.

19 Claims, 5 Drawing Sheets

U.S. PATENT DOCUMENTS

| | | |
|---|---|---|
| 4,736,094 A | 4/1988 | Yoshida |
| 4,739,328 A | 4/1988 | Koelle et al. |
| 4,837,422 A | 6/1989 | Dethloff et al. |
| 4,839,504 A | 6/1989 | Nakano |
| 4,868,849 A | 9/1989 | Tamaoki |
| 4,961,142 A | 10/1990 | Elliott et al. |
| 5,016,274 A | 5/1991 | Micali et al. |
| 5,023,782 A | 6/1991 | Lutz et al. |
| 5,023,908 A | 6/1991 | Weiss |
| 5,025,372 A | 6/1991 | Burton et al. |
| 5,053,774 A | 10/1991 | Schuermann et al. |
| 5,099,226 A | 3/1992 | Andrews |
| 5,101,200 A | 3/1992 | Swett |
| 5,197,140 A | 3/1993 | Balmer |
| 5,202,826 A | 4/1993 | McCarthy |
| 5,212,777 A | 5/1993 | Gove et al. |
| 5,221,838 A | 6/1993 | Gutman et al. |
| 5,222,282 A | 6/1993 | Sukonnik et al. |
| 5,226,989 A | 7/1993 | Sukonnik et al. |
| 5,239,654 A | 8/1993 | Ing-Simmons et al. |
| 5,247,304 A | 9/1993 | D'Hont |
| 5,274,392 A | 12/1993 | D'Hont et al. |
| 5,276,311 A | 1/1994 | Hennige |
| 5,285,100 A | 2/1994 | Byatt |
| 5,305,002 A | 4/1994 | Holodak et al. |
| 5,326,964 A | 7/1994 | Risser |
| 5,329,617 A | 7/1994 | Asal |
| 5,331,138 A | 7/1994 | Saroya |
| 5,339,447 A | 8/1994 | Balmer |
| 5,349,357 A | 9/1994 | Schuermann et al. |
| 5,350,906 A | 9/1994 | Brody et al. |
| 5,351,052 A | 9/1994 | D'Hont et al. |
| 5,365,551 A | 11/1994 | Snodgrass et al. |
| 5,371,896 A | 12/1994 | Gove et al. |
| 5,373,303 A | 12/1994 | D'Hont |
| 5,397,881 A | 3/1995 | Mannik |
| 5,407,893 A | 4/1995 | Koshizuka et al. |
| 5,408,243 A | 4/1995 | D'Hont |
| 5,410,649 A | 4/1995 | Gove et al. |
| 5,428,363 A | 6/1995 | D'Hont |
| 5,453,601 A | 9/1995 | Rosen et al. |
| 5,453,747 A | 9/1995 | D'Hont et al. |
| 5,461,217 A | 10/1995 | Claus |
| 5,471,592 A | 11/1995 | Gove et al. |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | D'Hont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | D'Hont |
| 5,500,513 A | 3/1996 | Langhans et al. |
| 5,500,651 A | 3/1996 | Schuermann |
| 5,504,808 A | 4/1996 | Hamrick, Jr. |
| 5,513,525 A | 5/1996 | Schurmann |
| 5,519,381 A | 5/1996 | Marsh |
| 5,522,083 A | 5/1996 | Gove et al. |
| 5,525,992 A | 6/1996 | Froschermeier |
| 5,525,994 A | 6/1996 | Hurta et al. |
| 5,530,232 A | 6/1996 | Taylor |
| 5,537,314 A | 7/1996 | Kanter |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,557,279 A | 9/1996 | D'Hont |
| 5,557,516 A | 9/1996 | Hogan |
| 5,561,430 A | 10/1996 | Knebelkamp |
| 5,563,582 A | 10/1996 | D'Hont |
| 5,569,187 A | 10/1996 | Kaiser |
| 5,572,226 A | 11/1996 | Tuttle |
| 5,577,109 A | 11/1996 | Stimson et al. |
| 5,577,120 A | 11/1996 | Penzias |
| 5,578,808 A | 11/1996 | Taylor |
| 5,581,630 A | 12/1996 | Bonneau, Jr. |
| 5,585,787 A | 12/1996 | Wallerstein |
| 5,590,038 A | 12/1996 | Pitroda |
| 5,592,150 A | 1/1997 | D'Hont |
| 5,592,405 A | 1/1997 | Gove et al. |
| 5,594,227 A | 1/1997 | Deo |
| 5,594,233 A | 1/1997 | Kenneth et al. |
| 5,594,448 A | 1/1997 | D'Hont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujiola |
| 5,606,520 A | 2/1997 | Gove et al. |
| 5,606,594 A | 2/1997 | Register |
| 5,607,522 A | 3/1997 | McDonnell |
| 5,608,406 A | 3/1997 | Eberth et al. |
| 5,608,778 A | 3/1997 | Partridge, III |
| 5,613,146 A | 3/1997 | Gove et al. |
| 5,614,703 A | 3/1997 | Martin et al. |
| 5,619,207 A | 4/1997 | D'Hont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | D'Hont |
| 5,625,370 A | 4/1997 | D'Hont |
| 5,625,695 A | 4/1997 | M'Raihi |
| 5,629,981 A * | 5/1997 | Nerlikar ........................ 713/168 |
| 5,638,080 A | 6/1997 | Orthmann et al. |
| 5,640,002 A | 6/1997 | Ruppert et al. |
| 5,641,050 A | 6/1997 | Smith et al. |
| 5,646,607 A | 7/1997 | Schuermann |
| 5,649,117 A * | 7/1997 | Landry ........................... 705/40 |
| 5,649,118 A | 7/1997 | Carlisle et al. |
| 5,657,388 A | 8/1997 | Weiss |
| 5,660,319 A | 8/1997 | Falcone et al. |
| 5,673,106 A | 9/1997 | Thompson |
| 5,675,342 A | 10/1997 | Sharpe et al. |
| 5,686,920 A | 11/1997 | Hurta et al. |
| 5,689,100 A | 11/1997 | Carrithers |
| 5,691,731 A | 11/1997 | van Erven |
| 5,692,132 A | 11/1997 | Hogan |
| 5,696,913 A | 12/1997 | Gove et al. |
| 5,698,837 A | 12/1997 | Furuta |
| 5,699,528 A | 12/1997 | Hogan |
| 5,701,127 A | 12/1997 | Sharpe |
| 5,704,046 A | 12/1997 | Hogan |
| 5,705,798 A | 1/1998 | Tarbox |
| 5,715,399 A | 2/1998 | Bezos |
| 5,721,781 A | 2/1998 | Deo et al. |
| 5,724,424 A | 3/1998 | Gifford |
| 5,729,053 A | 3/1998 | Orthmann |
| 5,729,236 A | 3/1998 | Flaxl |
| 5,731,957 A | 3/1998 | Brennan |
| 5,732,579 A | 3/1998 | D'Hont et al. |
| 5,734,838 A | 3/1998 | Robinson et al. |
| 5,742,756 A | 4/1998 | Dillaway et al. |
| 5,742,845 A | 4/1998 | Wagner |
| 5,748,137 A | 5/1998 | D'Hont |
| 5,748,737 A | 5/1998 | Daggar |
| 5,758,195 A | 5/1998 | Balmer |
| 5,761,306 A | 6/1998 | Lewis |
| 5,761,493 A | 6/1998 | Blakeley et al. |
| 5,761,669 A * | 6/1998 | Montague et al. ......... 707/103 R |
| 5,768,385 A | 6/1998 | Simon |
| 5,768,609 A | 6/1998 | Gove et al. |
| 5,770,843 A | 6/1998 | Rose |
| 5,774,882 A | 6/1998 | Keen et al. |
| 5,777,903 A | 7/1998 | Piosenka et al. |
| 5,778,067 A | 7/1998 | Jones |
| 5,778,069 A | 7/1998 | Thomlinson |
| 5,785,680 A | 7/1998 | Niezink et al. |
| 5,792,337 A | 8/1998 | Padovani et al. |
| 5,793,324 A | 8/1998 | Aslanidis et al. |
| 5,794,095 A | 8/1998 | Thompson |
| 5,797,060 A | 8/1998 | Thompson |
| 5,797,085 A | 8/1998 | Beuk et al. |

| | | | | | |
|---|---|---|---|---|---|
| 5,797,133 A | 8/1998 | Jones et al. | 5,966,697 A | 10/1999 | Fergerson et al. |
| 5,798,709 A | 8/1998 | Flaxl | 5,970,148 A | 10/1999 | Meier |
| 5,809,142 A | 9/1998 | Hurta et al. | 5,970,471 A | 10/1999 | Hill |
| 5,809,288 A | 9/1998 | Balmer | 5,970,472 A | 10/1999 | Allsop et al. |
| 5,809,633 A | 9/1998 | Mundigl et al. | 5,970,473 A | 10/1999 | Gerszberg et al. |
| 5,825,007 A | 10/1998 | Jesadanont | 5,970,475 A | 10/1999 | Barnes et al. |
| 5,825,302 A | 10/1998 | Stafford | RE36,365 E | 11/1999 | Levine et al. |
| 5,826,077 A | 10/1998 | Blakeley et al. | 5,978,840 A | 11/1999 | Nguyen et al. |
| 5,826,241 A | 10/1998 | Stein | 5,979,757 A | 11/1999 | Tracy et al. |
| 5,826,242 A | 10/1998 | Montulli | 5,982,293 A | 11/1999 | Everett et al. |
| 5,826,243 A | 10/1998 | Musmanno et al. | 5,983,207 A | 11/1999 | Turk et al. |
| 5,828,044 A | 10/1998 | Jun et al. | 5,983,208 A | 11/1999 | Haller et al. |
| 5,834,756 A | 11/1998 | Gutman et al. | 5,984,180 A | 11/1999 | Albrecht |
| 5,835,894 A | 11/1998 | Adcock et al. | 5,987,140 A | 11/1999 | Rowney et al. |
| 5,841,364 A | 11/1998 | Hagl et al. | 5,987,155 A | 11/1999 | Dunn et al. |
| 5,842,088 A | 11/1998 | Thompson | 5,987,498 A | 11/1999 | Athing et al. |
| 5,844,218 A | 12/1998 | Kawan et al. | 5,989,950 A | 11/1999 | Wu |
| 5,844,230 A | 12/1998 | Lalonde | 5,991,413 A | 11/1999 | Arditti et al. |
| 5,845,267 A | 12/1998 | Ronen | 5,991,608 A | 11/1999 | Leyten |
| 5,851,149 A | 12/1998 | Xidos et al. | 5,991,748 A | 11/1999 | Taskett |
| 5,852,812 A | 12/1998 | Reeder | 5,991,750 A | 11/1999 | Watson |
| 5,854,891 A | 12/1998 | Postlewaite | 5,996,076 A | 11/1999 | Rowney et al. |
| 5,858,006 A | 1/1999 | Van der AA et al. | 5,999,914 A | 12/1999 | Blinn et al. |
| 5,859,419 A | 1/1999 | Wynn | 6,000,832 A | 12/1999 | Franklin et al. |
| 5,859,779 A | 1/1999 | Giordano et al. | 6,002,438 A | 12/1999 | Hocevar et al. |
| 5,862,325 A | 1/1999 | Reed et al. | 6,002,767 A | 12/1999 | Kramer |
| 5,864,306 A | 1/1999 | Dwyer et al. | 6,003,014 A | 12/1999 | Lee et al. |
| 5,864,323 A | 1/1999 | Berthon | 6,005,942 A | 12/1999 | Chan et al. |
| 5,864,830 A | 1/1999 | Armetta et al. | 6,006,216 A | 12/1999 | Griffin et al. |
| 5,867,100 A | 2/1999 | D'Hont | 6,009,412 A | 12/1999 | Storey |
| 5,870,031 A | 2/1999 | Kaiser et al. | 6,011,487 A | 1/2000 | Plocher |
| 5,870,915 A | 2/1999 | D'Hont | 6,012,039 A | 1/2000 | Hoffman et al. |
| 5,878,138 A | 3/1999 | Yacobi | 6,012,049 A | 1/2000 | Kawan |
| 5,878,141 A | 3/1999 | Daly et al. | 6,012,143 A | 1/2000 | Tanaka |
| 5,878,215 A | 3/1999 | Kling et al. | 6,012,636 A | 1/2000 | Smith |
| 5,878,337 A | 3/1999 | Joao et al. | 6,014,634 A | 1/2000 | Scroggie et al. |
| 5,878,403 A | 3/1999 | DeFrancesco et al. | 6,014,635 A | 1/2000 | Harris et al. |
| 5,880,675 A | 3/1999 | Trautner | 6,014,636 A | 1/2000 | Reeder |
| 5,881,272 A | 3/1999 | Balmer | 6,014,645 A | 1/2000 | Cunningham |
| 5,883,810 A | 3/1999 | Franklin et al. | 6,014,646 A | 1/2000 | Vallee et al. |
| 5,884,280 A | 3/1999 | Yoshioka et al. | 6,014,648 A | 1/2000 | Brennan |
| 5,887,266 A | 3/1999 | Heinonen et al. | 6,014,650 A | 1/2000 | Zampese |
| 5,890,137 A | 3/1999 | Koreeda | 6,014,748 A | 1/2000 | Tushi et al. |
| 5,897,622 A | 4/1999 | Blinn et al. | 6,016,482 A | 1/2000 | Molinari et al. |
| 5,898,783 A | 4/1999 | Rohrbach | 6,016,484 A * | 1/2000 | Williams et al. ............ 705/39 |
| 5,898,838 A | 4/1999 | Wagner | 6,018,717 A | 1/2000 | Lee et al. |
| 5,903,830 A | 5/1999 | Joao et al. | 6,018,718 A | 1/2000 | Walker et al. |
| 5,903,875 A | 5/1999 | Kohara | 6,021,943 A | 2/2000 | Chastain |
| 5,903,880 A | 5/1999 | Biffar | 6,023,510 A | 2/2000 | Epstein |
| 5,905,798 A | 5/1999 | Nerlikar et al. | 6,024,286 A | 2/2000 | Bradley et al. |
| 5,905,908 A | 5/1999 | Wagner | 6,029,147 A | 2/2000 | Horadan et al. |
| 5,909,492 A | 6/1999 | Payne et al. | 6,029,149 A | 2/2000 | Dykstra et al. |
| 5,912,678 A | 6/1999 | Saxena et al. | 6,029,150 A | 2/2000 | Kravitz |
| 5,913,203 A | 6/1999 | Wong et al. | 6,029,890 A | 2/2000 | Austin |
| 5,914,472 A | 6/1999 | Foladare et al. | 6,029,892 A | 2/2000 | Miyake |
| 5,915,023 A | 6/1999 | Bernstein | 6,032,136 A | 2/2000 | Brake, Jr. et al. |
| 5,917,168 A | 6/1999 | Nakamura et al. | 6,038,292 A | 3/2000 | Thomas |
| 5,918,216 A | 6/1999 | Miksovsky et al. | 6,038,551 A | 3/2000 | Barlow et al. |
| 5,920,628 A | 7/1999 | Indeck et al. | 6,038,584 A | 3/2000 | Balmer |
| 5,923,734 A | 7/1999 | Taskett | 6,041,308 A | 3/2000 | Walker et al. |
| 5,929,801 A | 7/1999 | Aslanidis et al. | 6,044,360 A | 3/2000 | Picciallo |
| 5,930,767 A | 7/1999 | Reber et al. | 6,047,888 A | 4/2000 | Dethloff |
| 5,930,777 A | 7/1999 | Barber | 6,052,675 A | 4/2000 | Checchio |
| 5,931,917 A | 8/1999 | Nguyen et al. | 6,058,418 A | 5/2000 | Kobata |
| 5,933,624 A | 8/1999 | Balmer | 6,061,344 A | 5/2000 | Wood, Jr. |
| 5,943,624 A | 8/1999 | Fox | 6,061,789 A | 5/2000 | Hauser et al. |
| 5,948,116 A | 9/1999 | Aslanidis et al. | 6,064,320 A | 5/2000 | D'Hont |
| 5,949,044 A | 9/1999 | Walker et al. | 6,064,981 A | 5/2000 | Barni et al. |
| 5,949,876 A | 9/1999 | Ginter et al. | 6,070,003 A | 5/2000 | Gove et al. |
| 5,953,512 A | 9/1999 | Cai et al. | 6,070,150 A | 5/2000 | Remington et al. |
| 5,953,710 A | 9/1999 | Fleming | 6,070,154 A | 5/2000 | Tavor et al. |
| 5,955,717 A | 9/1999 | Vanstone | 6,072,870 A | 6/2000 | Nguyen et al. |
| 5,955,969 A | 9/1999 | D'Hont | 6,073,840 A | 6/2000 | Marion |
| 5,956,024 A | 9/1999 | Strickland et al. | 6,076,078 A | 6/2000 | Camp et al. |
| 5,956,699 A | 9/1999 | Wong et al. | 6,078,888 A | 6/2000 | Johnson, Jr. |
| 5,958,004 A | 9/1999 | Helland et al. | 6,078,906 A | 6/2000 | Huberman |
| 5,960,411 A | 9/1999 | Hartman et al. | 6,078,908 A | 6/2000 | Schmitz |
| 5,963,915 A | 10/1999 | Kirsch | 6,081,790 A | 6/2000 | Rosen |
| 5,963,924 A | 10/1999 | Williams et al. | RE36,788 E | 7/2000 | Mansvelt et al. |

| Patent No. | Date | Inventor |
|---|---|---|
| 6,088,683 A | 7/2000 | Jalili |
| 6,088,686 A | 7/2000 | Walker et al. |
| 6,088,717 A | 7/2000 | Reed et al. |
| 6,088,797 A | 7/2000 | Rosen |
| 6,092,057 A | 7/2000 | Zimmerman et al. |
| 6,092,198 A | 7/2000 | Lanzy et al. |
| 6,098,053 A | 8/2000 | Slater |
| 6,098,879 A * | 8/2000 | Terranova .................. 235/384 |
| 6,101,174 A | 8/2000 | Langston |
| 6,102,162 A | 8/2000 | Teicher |
| 6,102,672 A | 8/2000 | Woollenweber et al. |
| 6,105,008 A | 8/2000 | Davis et al. |
| 6,105,013 A | 8/2000 | Curry et al. |
| 6,105,865 A | 8/2000 | Hardesty |
| 6,108,641 A | 8/2000 | Kenna et al. |
| 6,109,525 A | 8/2000 | Blomqvist et al. |
| 6,112,152 A | 8/2000 | Tuttle |
| 6,112,191 A | 8/2000 | Burke |
| 6,115,360 A | 9/2000 | Quay et al. |
| 6,115,458 A | 9/2000 | Taskett |
| 6,116,423 A | 9/2000 | Troxtell, Jr. |
| 6,116,505 A | 9/2000 | Withrow |
| 6,118,189 A | 9/2000 | Flaxl |
| 6,121,544 A | 9/2000 | Petsinger |
| 6,122,625 A | 9/2000 | Rosen |
| 6,123,223 A | 9/2000 | Watkins |
| 6,125,352 A | 9/2000 | Franklin et al. |
| 6,129,274 A | 10/2000 | Suzuki |
| 6,133,834 A | 10/2000 | Eberth et al. |
| 6,141,651 A | 10/2000 | Riley et al. |
| 6,141,752 A | 10/2000 | Dancs et al. |
| 6,163,771 A | 12/2000 | Walker et al. |
| 6,167,236 A | 12/2000 | Kaiser et al. |
| 6,173,269 B1 | 1/2001 | Sokol et al. |
| 6,173,272 B1 | 1/2001 | Thomas et al. |
| 6,177,860 B1 | 1/2001 | Cromer et al. |
| 6,179,205 B1 | 1/2001 | Sloan |
| 6,179,206 B1 | 1/2001 | Matsumori |
| 6,188,994 B1 | 2/2001 | Egendorf |
| 6,189,787 B1 | 2/2001 | Dorf |
| 6,192,255 B1 | 2/2001 | Lewis et al. |
| 6,198,728 B1 | 3/2001 | Hulyalkar et al. |
| 6,198,875 B1 | 3/2001 | Edenson et al. |
| 6,202,927 B1 | 3/2001 | Bashan et al. |
| 6,205,151 B1 | 3/2001 | Quay et al. |
| 6,206,293 B1 | 3/2001 | Gutman et al. |
| 6,213,390 B1 | 4/2001 | Oneda |
| 6,215,437 B1 | 4/2001 | Schuermann |
| 6,216,219 B1 | 4/2001 | Cai et al. |
| 6,219,439 B1 | 4/2001 | Burger |
| 6,220,510 B1 | 4/2001 | Everett et al. |
| 6,222,914 B1 | 4/2001 | McMullin |
| D442,627 S | 5/2001 | Webb et al. |
| D442,629 S | 5/2001 | Webb et al. |
| 6,223,984 B1 | 5/2001 | Renner et al. |
| 6,226,382 B1 | 5/2001 | M'Raihi |
| 6,227,447 B1 | 5/2001 | Campisano |
| 6,230,270 B1 | 5/2001 | Laczko, Sr. |
| 6,232,917 B1 | 5/2001 | Baumer et al. |
| 6,233,683 B1 | 5/2001 | Chan et al. |
| 6,237,848 B1 | 5/2001 | Everett |
| 6,239,675 B1 | 5/2001 | Flaxl |
| 6,240,187 B1 | 5/2001 | Lewis |
| 6,248,199 B1 | 6/2001 | Smulson |
| 6,257,486 B1 | 7/2001 | Teicher et al. |
| 6,259,769 B1 | 7/2001 | Page et al. |
| 6,260,026 B1 | 7/2001 | Tomida et al. |
| 6,260,088 B1 | 7/2001 | Gove et al. |
| 6,263,316 B1 | 7/2001 | Khan et al. |
| 6,264,106 B1 | 7/2001 | Bridgelall |
| 6,266,754 B1 | 7/2001 | Laczko et al. |
| 6,267,292 B1 | 7/2001 | Walker et al. |
| 6,269,348 B1 | 7/2001 | Pare et al. |
| 6,273,335 B1 | 8/2001 | Sloan |
| 6,282,522 B1 | 8/2001 | Davis et al. |
| D447,515 S | 9/2001 | Faenza, Jr. et al. |
| 6,286,763 B1 | 9/2001 | Reynolds et al. |
| 6,289,324 B1 | 9/2001 | Kawan |
| 6,293,462 B1 | 9/2001 | Gangi |
| 6,314,409 B2 * | 11/2001 | Schneck et al. .................. 705/54 |
| 6,315,193 B1 | 11/2001 | Hogan |
| 6,315,195 B1 | 11/2001 | Ramachandran |
| 6,317,721 B1 | 11/2001 | Hurta et al. |
| 6,318,636 B1 | 11/2001 | Reynolds et al. |
| 6,323,566 B1 | 11/2001 | Meier et al. |
| 6,325,285 B1 | 12/2001 | Baratelli |
| 6,325,293 B1 | 12/2001 | Moreno |
| 6,326,934 B1 | 12/2001 | Kinzie |
| 6,327,573 B1 | 12/2001 | Walker et al. |
| 6,330,544 B1 | 12/2001 | Walker et al. |
| 6,332,193 B1 | 12/2001 | Glass et al. |
| 6,336,095 B1 | 1/2002 | Rosen |
| 6,342,844 B1 | 1/2002 | Rozin |
| 6,353,811 B1 | 3/2002 | Weissman |
| 6,364,208 B1 | 4/2002 | Stanford et al. |
| 6,367,011 B1 | 4/2002 | Lee et al. |
| 6,374,245 B1 | 4/2002 | Park |
| 6,377,034 B1 | 4/2002 | Ivanov |
| 6,378,073 B1 | 4/2002 | Davis et al. |
| 6,388,533 B2 | 5/2002 | Swoboda |
| 6,390,375 B2 | 5/2002 | Kayanakis |
| 6,400,272 B1 | 6/2002 | Holtzman |
| 6,402,026 B1 | 6/2002 | Schwier |
| 6,402,028 B1 | 6/2002 | Graham et al. |
| 6,411,611 B1 | 6/2002 | van der Tuijn |
| 6,415,978 B1 | 7/2002 | McAllister |
| 6,422,464 B1 | 7/2002 | Terranova |
| 6,422,532 B1 | 7/2002 | Garner |
| 6,424,029 B1 | 7/2002 | Giesler |
| RE37,822 E | 8/2002 | Anthonyson |
| 6,427,910 B1 | 8/2002 | Barnes et al. |
| 6,438,235 B2 | 8/2002 | Sims, III |
| 6,439,455 B1 | 8/2002 | Everett et al. |
| 6,445,794 B1 | 9/2002 | Shefi |
| 6,457,996 B1 | 10/2002 | Shih |
| 6,466,804 B1 | 10/2002 | Pecen et al. |
| 6,473,500 B1 | 10/2002 | Risafi et al. |
| 6,480,100 B1 | 11/2002 | Frieden et al. |
| 6,480,101 B1 | 11/2002 | Kelly et al. |
| 6,481,621 B1 | 11/2002 | Herrendoerfer et al. |
| 6,481,632 B2 | 11/2002 | Wentker et al. |
| 6,483,427 B1 | 11/2002 | Werb |
| 6,483,477 B1 | 11/2002 | Plonka |
| 6,483,929 B1 | 11/2002 | Murakami |
| 6,484,937 B1 | 11/2002 | Devaux et al. |
| 6,490,443 B1 | 12/2002 | Freeny, Jr. |
| 6,491,229 B1 | 12/2002 | Berney |
| 6,494,380 B2 | 12/2002 | Jarosz |
| 6,507,762 B1 | 1/2003 | Amro et al. |
| 6,510,983 B2 | 1/2003 | Horowitz et al. |
| 6,510,998 B1 | 1/2003 | Stanford et al. |
| 6,513,015 B2 | 1/2003 | Ogasawara |
| 6,519,565 B1 | 2/2003 | Clements et al. |
| 6,520,542 B2 | 2/2003 | Thompson et al. |
| 6,529,880 B1 | 3/2003 | McKeen et al. |
| 6,535,726 B1 | 3/2003 | Johnson |
| 6,546,373 B1 | 4/2003 | Cerra |
| 6,547,133 B1 | 4/2003 | DeVries, Jr. |
| 6,549,912 B1 | 4/2003 | Chen |
| 6,560,581 B1 | 5/2003 | Fox et al. |
| 6,577,229 B1 | 6/2003 | Bonneau et al. |
| 6,578,768 B1 | 6/2003 | Binder et al. |
| 6,581,839 B1 | 6/2003 | Lasch et al. |
| 6,587,835 B1 | 7/2003 | Treyz et al. |
| 6,588,660 B1 | 7/2003 | Buescher et al. |
| 6,589,119 B1 | 7/2003 | Orus et al. |
| 6,598,024 B1 | 7/2003 | Walker et al. |
| 6,608,995 B1 | 8/2003 | Kawasaki et al. |
| 6,609,655 B1 | 8/2003 | Harrell |
| 6,623,039 B2 | 9/2003 | Thompson et al. |
| 6,626,356 B2 | 9/2003 | Davenport et al. |
| 6,628,961 B1 | 9/2003 | Ho et al. |
| 6,629,591 B1 | 10/2003 | Griswold et al. |
| 6,636,833 B1 | 10/2003 | Flitcroft et al. |
| 6,650,887 B2 | 11/2003 | McGregor et al. |
| 6,662,166 B2 | 12/2003 | Pare et al. |
| 6,665,405 B1 | 12/2003 | Lenstra |
| 6,669,086 B2 | 12/2003 | Abdi et al. |

| | | |
|---|---|---|
| 6,671,358 B1 | 12/2003 | Seidman et al. |
| 6,674,786 B1 | 1/2004 | Nakamura et al. |
| 6,679,427 B1 | 1/2004 | Kuroiwa |
| 6,681,328 B1 | 1/2004 | Harris et al. |
| 6,684,269 B2 | 1/2004 | Wagner |
| 6,687,714 B1 | 2/2004 | Kogen et al. |
| 6,690,930 B1 | 2/2004 | Dupre |
| 6,693,513 B2 | 2/2004 | Tuttle |
| 6,703,918 B1 | 3/2004 | Kita |
| 6,705,530 B2 | 3/2004 | Kiekhaefer |
| 6,711,262 B1 | 3/2004 | Vatanen |
| 6,732,936 B1 | 5/2004 | Kiekhaefer |
| 6,742,120 B1 | 5/2004 | Markakis et al. |
| 6,747,546 B1 | 6/2004 | Hikita et al. |
| 6,760,581 B2 | 7/2004 | Dutta |
| 6,769,718 B1 | 8/2004 | Warther et al. |
| 6,771,981 B1 | 8/2004 | Zalewski et al. |
| 6,789,012 B1 | 9/2004 | Childs et al. |
| 6,834,270 B1 | 12/2004 | Pagani et al. |
| 6,851,617 B2 | 2/2005 | Saint et al. |
| 6,853,087 B2 | 2/2005 | Neuhaus et al. |
| 6,853,894 B1 | 2/2005 | Kolls |
| 6,853,987 B1 | 2/2005 | Cook |
| 6,857,566 B2 | 2/2005 | Wankmueller |
| 6,859,672 B2 | 2/2005 | Roberts et al. |
| 6,889,198 B2 * | 5/2005 | Kawan ............... 705/14.27 |
| 6,895,310 B1 | 5/2005 | Kolls |
| 6,994,262 B1 | 2/2006 | Warther |
| 7,003,501 B2 | 2/2006 | Ostroff |
| 7,069,444 B2 | 6/2006 | Lowensohn et al. |
| 7,096,204 B1 | 8/2006 | Chen et al. |
| 7,100,821 B2 | 9/2006 | Rasti |
| 7,103,575 B1 | 9/2006 | Linehan |
| 7,136,835 B1 | 11/2006 | Flitcroft et al. |
| 7,213,748 B2 | 5/2007 | Tsuei et al. |
| 2001/0013542 A1 | 8/2001 | Horowitz et al. |
| 2001/0024157 A1 | 9/2001 | Hansmann et al. |
| 2001/0034565 A1 | 10/2001 | Leatherman |
| 2001/0034720 A1 | 10/2001 | Armes |
| 2001/0039617 A1 | 11/2001 | Buhrlen et al. |
| 2001/0049628 A1 | 12/2001 | Icho |
| 2002/0011519 A1 | 1/2002 | Shults, III |
| 2002/0026419 A1 | 2/2002 | Maritzen et al. |
| 2002/0028704 A1 | 3/2002 | Bloomfield et al. |
| 2002/0035548 A1 | 3/2002 | Hogan et al. |
| 2002/0046341 A1 | 4/2002 | Kazaks et al. |
| 2002/0052839 A1 | 5/2002 | Takatori |
| 2002/0062284 A1 | 5/2002 | Kawan |
| 2002/0074398 A1 | 6/2002 | Lancos et al. |
| 2002/0077837 A1 | 6/2002 | Krueger et al. |
| 2002/0077895 A1 | 6/2002 | Howell |
| 2002/0077992 A1 | 6/2002 | Tobin |
| 2002/0079367 A1 | 6/2002 | Montani |
| 2002/0092914 A1 | 7/2002 | Pentz et al. |
| 2002/0095298 A1 | 7/2002 | Ewing |
| 2002/0095343 A1 | 7/2002 | Barton et al. |
| 2002/0095389 A1 | 7/2002 | Gaines |
| 2002/0095587 A1 | 7/2002 | Doyle et al. |
| 2002/0097144 A1 | 7/2002 | Collins et al. |
| 2002/0107007 A1 | 8/2002 | Gerson |
| 2002/0107742 A1 | 8/2002 | Magill |
| 2002/0109580 A1 | 8/2002 | Shreve et al. |
| 2002/0111210 A1 | 8/2002 | Luciano, Jr. et al. |
| 2002/0111917 A1 | 8/2002 | Hoffman et al. |
| 2002/0113082 A1 | 8/2002 | Leatherman et al. |
| 2002/0116274 A1 | 8/2002 | Hind et al. |
| 2002/0120584 A1 | 8/2002 | Hogan et al. |
| 2002/0126010 A1 | 9/2002 | Trimble et al. |
| 2002/0131567 A1 | 9/2002 | Maginas |
| 2002/0138438 A1 | 9/2002 | Bardwell |
| 2002/0140542 A1 | 10/2002 | Prokoski et al. |
| 2002/0145043 A1 | 10/2002 | Challa et al. |
| 2002/0147913 A1 | 10/2002 | Lun Yip |
| 2002/0148892 A1 | 10/2002 | Bardwell |
| 2002/0152123 A1 | 10/2002 | Giordano et al. |
| 2002/0154795 A1 | 10/2002 | Lee et al. |
| 2002/0166891 A1 | 11/2002 | Stoutenberg et al. |
| 2002/0174067 A1 | 11/2002 | Hoffman et al. |
| 2002/0176522 A1 | 11/2002 | Fan |
| 2002/0178063 A1 | 11/2002 | Gravelle et al. |
| 2002/0178369 A1 | 11/2002 | Black |
| 2002/0185543 A1 | 12/2002 | Pentz et al. |
| 2002/0188501 A1 | 12/2002 | Lefkowith |
| 2002/0190125 A1 | 12/2002 | Stockhammer |
| 2002/0194303 A1 | 12/2002 | Suila et al. |
| 2002/0194503 A1 | 12/2002 | Faith et al. |
| 2002/0196963 A1 | 12/2002 | Bardwell |
| 2003/0009382 A1 | 1/2003 | D'Arbeloff et al. |
| 2003/0014307 A1 | 1/2003 | Heng |
| 2003/0014357 A1 | 1/2003 | Chrisekos et al. |
| 2003/0014891 A1 | 1/2003 | Nelms et al. |
| 2003/0018532 A1 | 1/2003 | Dudek et al. |
| 2003/0018567 A1 | 1/2003 | Flitcroft et al. |
| 2003/0025600 A1 | 2/2003 | Blanchard |
| 2003/0028481 A1 | 2/2003 | Flitcroft et al. |
| 2003/0046228 A1 | 3/2003 | Berney |
| 2003/0054836 A1 | 3/2003 | Michot |
| 2003/0055727 A1 | 3/2003 | Walker et al. |
| 2003/0057226 A1 | 3/2003 | Long |
| 2003/0057278 A1 | 3/2003 | Wong |
| 2003/0069828 A1 | 4/2003 | Blazey et al. |
| 2003/0069846 A1 | 4/2003 | Marcon |
| 2003/0112972 A1 | 6/2003 | Hattick et al. |
| 2003/0120554 A1 | 6/2003 | Hogan et al. |
| 2003/0121969 A1 | 7/2003 | Wankmueller |
| 2003/0130820 A1 | 7/2003 | Lane, III |
| 2003/0132284 A1 | 7/2003 | Reynolds et al. |
| 2003/0140228 A1 | 7/2003 | Binder |
| 2003/0163699 A1 | 8/2003 | Pailles et al. |
| 2003/0167207 A1 | 9/2003 | Berardi et al. |
| 2003/0177347 A1 | 9/2003 | Schneier et al. |
| 2003/0183689 A1 | 10/2003 | Swift et al. |
| 2003/0183699 A1 | 10/2003 | Masui |
| 2003/0187786 A1 | 10/2003 | Swift et al. |
| 2003/0187787 A1 | 10/2003 | Freund |
| 2003/0187790 A1 | 10/2003 | Swift et al. |
| 2003/0187796 A1 | 10/2003 | Swift et al. |
| 2003/0195037 A1 | 10/2003 | Vuong et al. |
| 2003/0195842 A1 | 10/2003 | Reece |
| 2003/0195843 A1 | 10/2003 | Matsuda et al. |
| 2003/0200184 A1 | 10/2003 | Dominguez et al. |
| 2003/0218066 A1 | 11/2003 | Fernandes et al. |
| 2003/0220876 A1 | 11/2003 | Burger et al. |
| 2003/0222153 A1 | 12/2003 | Pentz et al. |
| 2003/0225623 A1 | 12/2003 | Wankmueller |
| 2003/0225713 A1 | 12/2003 | Atkinson et al. |
| 2003/0227550 A1 | 12/2003 | Manico et al. |
| 2003/0233334 A1 | 12/2003 | Smith |
| 2004/0006539 A1 | 1/2004 | Royer et al. |
| 2004/0010462 A1 | 1/2004 | Moon et al. |
| 2004/0015451 A1 | 1/2004 | Sahota et al. |
| 2004/0016796 A1 | 1/2004 | Hann et al. |
| 2004/0020982 A1 | 2/2004 | Hoffman et al. |
| 2004/0029569 A1 | 2/2004 | Khan et al. |
| 2004/0030601 A1 | 2/2004 | Pond et al. |
| 2004/0039814 A1 | 2/2004 | Crabtree et al. |
| 2004/0039860 A1 | 2/2004 | Mills et al. |
| 2004/0044627 A1 | 3/2004 | Russell et al. |
| 2004/0083184 A1 | 4/2004 | Tsuei et al. |
| 2004/0139021 A1 | 7/2004 | Reed et al. |
| 2005/0017068 A1 | 1/2005 | Zalewski et al. |
| 2005/0038718 A1 | 2/2005 | Barnes et al. |
| 2005/0040272 A1 | 2/2005 | Argumedo et al. |
| 2005/0119978 A1 | 6/2005 | Ates |
| 2005/0121512 A1 | 6/2005 | Wankmueller |

FOREIGN PATENT DOCUMENTS

| | | |
|---|---|---|
| EP | 0 424 726 A1 | 5/1991 |
| EP | 0 484 726 A1 | 5/1992 |
| EP | 0 933 717 A2 | 8/1999 |
| EP | 0 956 818 A1 | 11/1999 |
| EP | 0 959 440 A2 | 11/1999 |
| EP | 0 984 404 A2 | 3/2000 |
| EP | 1 016 947 A2 | 7/2000 |
| EP | 1 039 403 A2 | 9/2000 |
| EP | 1 104 909 A2 | 6/2001 |
| EP | 1 113 387 A2 | 7/2001 |
| EP | 1 115 095 A2 | 7/2001 |

| EP | 1 199 684 | A2 | 4/2002 |
| --- | --- | --- | --- |
| EP | 1 251 450 | A1 | 10/2002 |
| GB | 2 347 537 | A | 9/2000 |
| GB | 2 361 790 | A | 10/2001 |
| JP | 2000011109 | A | 1/2000 |
| JP | 2000015288 | A | 1/2000 |
| JP | 2000040181 | A | 2/2000 |
| JP | 2000067312 | A | 3/2000 |
| JP | 2000207641 | A | 7/2000 |
| JP | 2001005931 | A | 1/2001 |
| JP | 2001283122 | A | 10/2001 |
| WO | 95/32919 | A1 | 12/1995 |
| WO | 97/09688 | A3 | 3/1997 |
| WO | 99/03057 | A1 | 1/1999 |
| WO | 99/49424 | A1 | 9/1999 |
| WO | 00/10144 | A1 | 2/2000 |
| WO | 00/38088 | A1 | 6/2000 |
| WO | 00/49586 | A1 | 8/2000 |
| WO | 01/04825 | A1 | 1/2001 |
| WO | 01/15098 | A1 | 3/2001 |
| WO | WO 01/15098 | A1 * | 3/2001 |
| WO | 01/43095 | A2 | 6/2001 |
| WO | 01/72224 | A1 | 10/2001 |
| WO | 01/77856 | A1 | 10/2001 |
| WO | 01/80473 | A2 | 10/2001 |
| WO | 01/86535 | A1 | 11/2001 |
| WO | 01/90962 | A1 | 11/2001 |
| WO | 01/95243 | A2 | 12/2001 |
| WO | 02/01485 | A1 | 1/2002 |
| WO | 02/13134 | A2 | 2/2002 |
| WO | 02/21903 | A1 | 3/2002 |
| WO | 02/063545 | A2 | 8/2002 |
| WO | 02/065246 | A3 | 8/2002 |
| WO | 02/065404 | A2 | 8/2002 |
| WO | 02/069221 | A1 | 9/2002 |
| WO | 02/073512 | A1 | 9/2002 |
| WO | 02/086665 | A2 | 10/2002 |
| WO | 02/091281 | A2 | 11/2002 |
| WO | 02/097575 | A2 | 12/2002 |
| WO | 02/101670 | A2 | 12/2002 |
| WO | 03/007623 | A3 | 1/2003 |

OTHER PUBLICATIONS http://www.palowireless.com/infotooth/whatis.asp, Apr. 28, 2003.
http://www.palowireless.com/infotooth/tutorial.asp, Apr. 28, 2003.
http://www.palowireless.com/infotooth/tutorial/profiles.asp, Apr. 28, 2003.
http://www.palowireless.com/infotooth/tutorial/radio.asp, Apr. 28, 2003.
http://www.palowireless.com/infotooth/tutorial/baseband.asp, Apr. 28, 2003.
http://www.palowireless.com/infotooth/tutorial/Imp.asp, Apr. 28, 2003.
http://www.palowireless.com/infotooth/tutorial/hci.asp, Apr. 28, 2003.
http://www.palowireless.com/infotooth/tutorial/l2cap.asp, Apr. 28, 2003.
http://www.palowireless.com/infotooth/tutorial/rfcomm.asp, Apr. 28, 2003.
http://www.palowireless.com/infotooth/tutorial/sdp.asp, Apr. 28, 2003.
http://www.palowireless.com/infotooth/tutorial/k1_gap.asp, Apr. 28, 2003.
Sony/Philips Press Release, Format Unknown, May 7, 2003, 2 pages.
International Search Report and Written Opinion of the International Searching Authority, PCT/US05/26067, May 23, 2007.
Goldwasser, Joan, "Best of the Cash-back Cards", Kiplinger's Personal Finance Magazine, Apr. 1999.
Greene, Thomas C., American Express offers temporary CC numbers for the Web, The Register, www.theregister.com.uk/content/1/13132.html, Sep. 9, 2000.
Harris, "How Fingerprint Scanners Work", http://computer.howstuffworks.com/fingerprint-scanner.htm/printable, Feb. 18, 2004, 6 pages.
Hurley et al., "Automatic Ear Recognition by Force Field Transformations", The Institution of Electrical Engineers, 2000, pp. 7/1-7/5.
International Newsletter of the TI RFID Group, 2000, Issue 20, 12 pages.
International Search Report and Written Opinion of the International Searching Authority, PCT/US05/26101, May 13, 2008.
Kaplan, Jeremy A., "Networking: Microsoft SPOT", http://www.pcmag.com/print_article/0,3048,a=43561,00.asp, Jul. 1, 2003, 2 pages.
Korotkaya, "Biometric Person Authentication: Odor", Department of Information Technology, Laboratory of Applied Mathematics, Lappeenranta University of Technology, 18 pages.
Krakow, "Credit on Your Key Ring, Buy Gas at Mobil, Exxon and Soon Burgers at McDonald's", MSNBC, http://www.msnbc.msn.com/id/3072638, Feb. 17, 2004, 4 pages.
Kulkarni, et al., "Biometrics: Speaker Verification" http://biometrics.cse.msu.edu/speaker.html, Mar. 8, 2004, 5 pages.
Kuntz, Mary, "Credit Cards as Good as Gold", Forbes, Nov. 4, 1985.
Lahey, Liam, "Microsoft Bolsters Rebate Structure", Computer Dealer News, Feb. 8, 2002.
Lamond, "Credit Card Transactions Real World and Online" © 1996.
Luettin, "Visual Speech and Speaker Recognition", http://herens.idiap.ch/~luettin/luettin-thesis.bib.abs.html, Jun. 30, 2000, 1 page.
Martin, Zack, One-Time Numbers Stop Web Hackers From Pilfering Data, Card Marketing, Thomson Financial, www.cardforum.com/html/cardmark/jan01_c3.htm, Jan. 2001.
McPerson, "The Evolution of Mobile Payment", Financial Insights, http://www.banktech.com/story/news/showArticle.jhtml?articleID=17601432, Feb. 2, 2004, 2 pages.
Niccolai, James, "CES: Microsoft's SPOT Technology has Humble Origins", http://archive.inforworld.com/articles/hn/xml/03/01/10/030110hnspot.xml?s=IDGNS, Jan. 10, 2003, 3 pages.
Nyman, Judy, "Free Income Tax Clinics are Opening as Apr. 30 Deadline Draws Nearer", The Toronto Star, Final Edition, Mar. 25, 1986.
Obel, Michael, "Oil Companies Push Marketing, Cost Cutting to Fortify Earnings", Oil & Gas Journal, Sep. 16, 1985.
Pay by Touch—Company, http://www.paybytouch.com/company.html.
Prophecy Central Update #9, http://www.bible.-prophecy.com/pcu9.htm, Oct. 10, 1997, 5 pages.
RFID Smart Card Gain Ground: The convenience of contactless transactions is driving widespread adoption of contactless smart "cards", RFID Journal, Apr. 9, 2003.
Roberti, "TI Embraces Prox Card Standard", http://www.ti.com/tiris/docs/news/in_the_news/2003/3-6-03.shtml, Mar. 6, 2003, 2 pages.
Rohde, "Microsoft, IBM and Phillips Test RFID Technology", IDG New Service, http://www.computerweekly.com/Article127889.htm, Feb. 9, 2004, 3 pages.
Ross et al., "Biometrics: Hand Geometry", http://biometrics.cse.msu.msu.edu/hand_geometry.html, Feb. 26, 2004, 2 pages.
"Credit Card Offer Travelers New Benefit", PR Newswire, Aug. 5, 1987.
"Fingerprint Analysis—The Basics", http://www.crimtrac.gov.au/fingerprintanalysis.htm, Feb. 18, 2004, 3 pages.
"Fingerprint Technology—Identix Inc.—Empowering Identification™—Understanding Biometrics", http://www.identix.com/newsroom/news_biometrics_finger.html, Feb. 18, 2004, 1 page.
"Identix Inc.—Empowering Identification™—Understanding Biometrics", http://www.identix.com/newsroom/news_biometrics_face.html, 1 page.
"Individual Biometric—Facial Recognition", http://ctl.ncsc.dni.us/biomet%20web/Bmfacial.html, Feb. 18, 2004, 2 pages.
"Individual Biometric—Fingerprint", http://ctl.ncsc.dni.us/biomet%20web/BMFingerprint.html, Feb. 18, 2004, 3 pages.
"Individual Biometric—Hand Geometry", http://ctl.ncsc.dni.us/biomet%20web/BMHand.html, Feb. 18, 2004, 2 pages.
"Individual Biometric—Iris Scan", http://ctl.ncsc.dni.us/biomet%20web/BMIris.html, Feb. 18, 2004, 2 pages.
"Individual Biometric—Retinal Scan", http://ctl.ncsc.dni.us/biomet%20web/BMRetinal.html, Feb. 18, 2004, 2 pages.
"Individual Biometric—Vascular Patterns", http://ctl.ncsc.dni.us/biomet%20web/BMVascular.html, Feb. 18, 2004, 1 page.

"Inside's Next-Gen Smart Card: The French company plans to introduce an RFID card that uses a 16-bit microprocessor and new encryption technology", RFID Journal, Oct. 29, 2002.

"International Biometric Group—Signature Biometrics: How it Works", http://www.ibgweb.com/reports/public/reports/signature-scan_tech.html, Feb. 18, 2004, 1 page.

"International Biometric Group—Voice Recognition Technology: How It Works", http://www.ibgweb.com/reports/public/reports/voice-scan_tech.html, Feb. 18, 2004, 1 page.

"ISO Magnetic Strip Card Standards", http://www.cyberd.co.uk/support/technotes/isocards.htm, Feb. 9, 2004, 4 pages.

"Japan Gets Digital Ticket System: A national ticket seller and phone company are teaming up to create an electronic-ticket network", RFID Journal, Aug. 21, 2002.

"Making RFID Payments Ubiquitous: Philips and Visa want people to be able to pay for goods and services anywhere by using RFID chips embedded in phones and other devices", RFID Journal, Jun. 2, 2003.

"MasterCard to Test RFID Card: Pilot will test whether consumers, merchants and credit card issuers value "contactless" payments", RFID Journal, Dec. 20, 2002.

"Microsoft Launches Smart Personal Object Technology Initiative", Press Release from COMDEX Fall 2002, http://www.Microsoft.com/presspass/features/2002/nov02/11-17SPOT.asp, Nov. 17, 2002, 4 pages.

"Mobile Speedpass Goes Global as Mobil Singapore Rolls Out Asia's First RFID-Based Pay-At-The-Pump System", http://www.ti.com/tiris/docs/news_releases/re112.htm, Apr. 5, 1999, Press Release.

"Multiple Frequency Transponders: Volume production of dual-band FRID chips begins", Frontline Solutions, Jul. 19, 2003.

"New Evidence about Positive Three-Tier Co-pay Performance Presented at Express Scripts 2000 Outcomes Conference", PR Newswire Association, Inc., Jun. 28, 2000.

"Pay by Touch—Press Releases", http://www.paybytouch.com/press/html, Feb. 10, 2004, 3 pages.

"Paying It by Ear", The Guardian http://money.guardian.co.uk/creditanddebt/creditcards/story/0,1456,876908,00.html, Jan. 18, 2003, 3 pages.

"PowerPay RFID Payment and Marketing Solution Speeds Purchases at Seahawks Stadium with Technology from Texas Instruments", http://www.powerpayit.com/news/Seahawks_pr.html, Feb. 9, 2004, 20 pages.

"Prestige Credit Cards: Those Pricey Plastics", Changing Times, Apr. 1986.

Security for Wireless Java: NTRU, a startup that offers security software, has released a Java version of its NTRU encryption algorithm, RFID Journal, Jun. 27, 2002.

"Shell Introduces Optional Credit Card", The Associated Press, Sep. 3, 1985.

"Shell Introducing Expanded 'Signature' Credit Card", Tulsa Business Chronicle, Sep. 5, 1985.

"Shell-Oil: Introduces Shell Signature Travel and Entertainment Credit Card", Business Wire, Sep. 3, 1985.

"Smart Card Developer's Kit: Some Basic Standards for Smart Card", http://unix.be.eu.org/docs/smart-card-developer-kit/ch03/033-035.html, Feb. 9, 2004, 2 pages.

"Sony, Philips Creating RFID Link: Consumer electronics giants are jointly developing a new RFID standard for payments and for communication between devices", RFID Journal, Sep. 17, 2002.

"Speedpass Unleashed", http://www.cardweb.com/cardtrak/news/cf2_20a_97/html, Jun. 4, 2002, 2 pages.

"The Chase Manhattan Bank Today Announced a Comprehensive Program to Enhance the Value of All its Credit Cards", PR Newswire, Dec. 18, 1986.

"The Henry Classification System", International Biometric Group, 7 pages.

"TI Embraces Prox Card Standard: Texas instrument's ISO 14443 payment platform promises faster data transfer rates and more security", RFID Journal, Mar. 6, 2003.

"Vendors Target Amusement Parks: Protecting children and enabling cashless payments make RFID an appealing option for the entertainment industry", RFID Journal, Nov. 27, 2002.

"What's New: Timex Watch Features Speedpass System", http://www.speedpass.com/news/article.jsp?id=51, 1 page.

American Express to offer disposable credit card numbers, CNN.com. U.S. News, www.cnn.com/2000/US/09/08/online.payments.ap/, Sep. 8, 2000.

American Express, Private Payments SM: A New Level of Security from American Express, American Express Website, Cards.

Bank Extends RFID Payment Pilot: Bank of America will continue to test its QuickWave RFID payment card for another three months, RFID Journal, Jan. 23, 2003.

Bonsor, "How Facial Recognition Systems Work", http://computer.howstuffworks.com/facial-recognition.htm/printable, Feb. 18, 2004, 6 pages.

Bowman, "Everything You Need to Know About Biometrics", Identix Corporation, Jan. 2008, 8 pages.

Brewin, Bob, "Magic Wands' to Speed Mobile Sales", http://www.computerworld.com/mobiletopics/mobile/story/1,10801,563300.html, Jan. 15, 2001.

Carey, Gordon, "Multi-tier Copay", Pharmaceutical Executive, Feb. 2000.

Crumbaugh, Darlene M., "Effective Marketing Positions: Check card as consumer lifeline", Hoosier Banker, Apr. 1998, p. 10, vol. 82, Issue 4.

Disposable Credit Card Numbers, courtesy of CardRatings.org, The Dollar Stretcher, www.stretcher.com/stories/01/010212e.cfm, Jan. 2001.

Docmemory, RFID Takes Priority With Wal-Mart, http://www.simmtester.com/page/news/shownews.asp?num=6650, Feb. 9, 2004, 2 pages.

Evers, "Judge Dismisses FTC Suite Against Rambus", IDG New Service, http://www.infoworld.com/article/04/02/18/HNjudgedismisses_1.html, Feb. 18, 2004, 3 pages.

Functional Specification, Standard Card IC MF1 1C S 50, Philips Semiconductors, Product Specification Re. 5.1, May 2001.

Gabber, et al., "Agora: A Minimal Distributed Protocol for Electronic Commerce", USENIX Oakland, CA, Nov. 18, 1996.

Schmuckler, Eric, "Playing Your Cards Right", Forbes, Dec. 28, 1987.

Sharp, Ken, Senior Technical Editor, "Physical Reality: A Second Look", http://www.idsystems.com/reader/1999-03/phys0399_pt2/phys0399_pt2.htm.

Shim, Richard, "Microsoft: See SPOT Run on Your Wrist", http://news.com/2100-1041_3-1013442.html?tag=fd_top, Jun. 5, 2003, 1 page.

Wilson, "Putting Their Finger on It", http://sanfrancisco.bizjournals.com/sanfrancisco/stories/2003/10/20/story6.html?t=printable, Feb. 9, 2004, 2 pages.

"Core One Credit Union—Discover the Advantage", http://coreone.org/2visa.html, Copyright 2001, (Last Visited Oct. 9, 2002).

"The Bank Credit Card Business", American Bankers Association, 1996, all pages.

* cited by examiner

SYSTEMS AND METHODS FOR MANAGING ACCOUNT INFORMATION LIFECYCLES

FIELD OF INVENTION

The present invention generally relates to payment systems, and more particularly, to systems and methods for managing multiple data sets on various card and "non-card" financial transaction instruments.

BACKGROUND OF THE INVENTION

Some financial transaction instruments, such as credit cards and loyalty program cards, are capable of accessing information related to multiple accounts. For example, a credit card may be able to access membership data associated with both a credit card account and a wholesale purchase club account. These financial transaction instruments generally include one or more applications for selecting and then securely utilizing a sub-set of specified account information. However, the systems associated with these cards typically delegate the loading of these applications and management of the related data sets to third parties on behalf of both the issuer of the instrument and "application tenants" residing on the issuer's financial transaction instruments. Thus, traditional solutions leave a disproportional burden on the issuer and/or the delegated third party in terms of managing accounts on a financial transaction instrument. Managing data associated with a credit card via the issuer/third party may involve time consuming steps such as requesting permission to manage data, conforming to data standard formats, and implementing changes.

This management of data and accounts may occur over the life of the account. In general, accounts associated with a financial transaction instrument have a life cycle. For example, an account associated with a credit card is typically created concurrent with the issuance of the card. The account may later be terminated for a variety of reasons. For example, an account may be terminated when the card associated with the account is unused for an extended period of time. Account termination may occur through static expiration dates, or as a consequence of a security related event, such as, for example, when a card is reported stolen. Furthermore, during the "life" of an account, changes may be made to the account. These changes may include, for example, upgrades in functionality related to an existing account, or the addition of a second application that is configured to function separately or in conjunction with another application associated with the first account. With respect to changing account information that is stored in association with a financial transaction instrument, an issuer will typically discard the old card and to issue a new card that includes the updated information. However, the replacement of financial transaction cards with updated transaction cards may include various procedures and requirements that may last several days or weeks.

In some instances, financial transaction instruments may be updated without the issuing of a new physical consumer device. In general, however, the issuer is involved in this process. The issuer may be involved, for example, by verifying compatibility of a proposed new application, checking conformance of the data to the issuer's standard formatting and size guidelines, and implementing the changes. Moreover, application tenants will generally first enter into contractual agreements with the issuer, or third party delegate of the issuer, before its application is added to the financial transaction instrument. Thus, additional burdens are placed on merchants or individuals who desire to add unique data sets to a financial transaction instrument.

That being said, the ability for multiple owners of data sets to independently and efficiently manage data sets and applications associated with a financial transaction instrument does not exist. Thus, a need exists for a system that can facilitate independent management of account information associated with financial transaction instruments. Additionally, a need exists for a system that can facilitate independent management of account information on a financial transaction instrument. Furthermore, a need exists for a system whereby the "life" of a financial transaction instrument is not necessarily related to the "life" of an account on that instrument and where the life of one account on that instrument is not necessarily related to the life of another account on that instrument.

SUMMARY OF THE INVENTION

Systems and methods are configured to manage data sets associated with a financial transaction instrument. In one exemplary embodiment of the present invention, a method is provided for facilitating the management of data sets on a financial transaction instrument that is issued by an issuer. The method includes the steps of: adding, by a first owner, a first data set to the financial transaction instrument, wherein the first data set is owned by a first owner; adding, by a second owner, a second data set to the financial transaction instrument, wherein the second data set is owned by a second owner; and storing the first data set and the second data set on the financial transaction instrument. The first and second data sets may each be stored as a Block of Binary. Furthermore, the first data set may be updated and/or deleted from the financial transaction instrument.

In another example, a financial transaction instrument comprises a data set management system for facilitating the management of more than one data set, the financial transaction instrument comprising at least one data storage area configured to store a first data set and a second data set. The first data set is associated with a first owner and the first data set is configured to be stored by the first owner independent of a second owner; and, the second data set is associated with the second owner and the second data set is configured to be stored by the second owner independent of the first owner.

In yet another exemplary embodiment of the present invention, a data management system comprises: a financial transaction instrument associated with a first data set and a second data set, wherein the financial transaction instrument is configured to facilitate either a first data set owner or a user of the financial transaction instrument in managing the first data set associated with the financial transaction instrument without involvement of an issuer of the financial transaction instrument. The data management system further comprises an interaction device configured to communicate with the financial transaction instrument.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

While the exemplary embodiments herein are described in sufficient detail to enable those skilled in the art to practice the invention, it should be understood that other embodiments may be realized and that logical and mechanical changes may be made without departing from the spirit and scope of the invention. Thus, the following detailed description is presented for purposes of illustration only and not of limitation.

Figure 1:
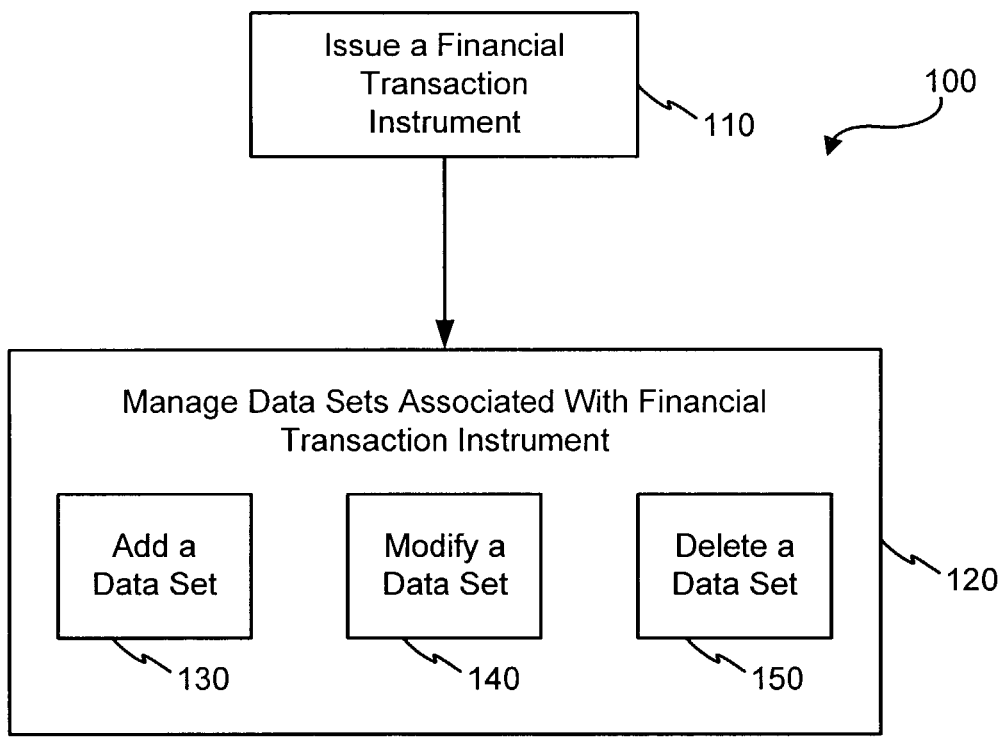
FIG. 1 illustrates a general overview of an exemplary data set management method in accordance with an exemplary embodiment of the present invention.

In general, systems and methods are configured to facilitate the management of data sets associated with a financial transaction instrument. Management of data sets may include such steps as adding, updating and/or deleting data sets associated with the financial transaction instrument without replacing or reissuing the financial transaction instrument. With reference to FIG. 1, an exemplary method 100 includes issuing a financial transaction instrument (step 110) and managing data sets associated with the financial transaction instrument (step 120). The financial transaction instrument may be issued with or without one or more data sets. A financial transaction instrument may be issued using various techniques and practices now known or hereinafter developed wherein an instrument is prepared (e.g., embossed and/or loaded with data) and made available to a user for effecting financial transactions.

Managing data sets associated with the financial transaction instrument (step 120) may include adding a data set (step 130), modifying a data set (step 140), and/or deleting a data set (step 150). Although the present invention may contemplate managing data sets (step 120) before issuing a financial transaction instrument (step 110), in various exemplary embodiments, the data sets are managed (step 120) after issuance (step 110).

In various exemplary embodiments, the steps of adding, deleting, and/or modifying data sets may be repeated. For example, first, second, and additional data sets may be added (step 130) to the financial transaction instrument in any order. In one exemplary embodiment of the present invention, the first data set is owned by a first data set owner and the second data set is owned by a second data set owner. Furthermore, the system may include replacing a first data set with a subsequent data set by deleting a data set (step 150), then adding a data set (step 130).

At any time after issuance (step 110) of the financial transaction instrument, such as a credit card, the financial transaction instrument may be used in a commercial transaction. In one exemplary embodiment of the present invention, a user communicates with a merchant, indicates a desire to acquire a product, and chooses to pay for the acquisition with a financial transaction instrument. As used herein, an acquisition or financial transaction includes the purchase, rental, lease, and/or the taking custody of goods or services. During the process of paying the merchant for the acquisition, the user presents a financial transaction instrument. The financial transaction instrument is configures to communicate, using various exemplary methods described herein, with the merchant. The financial transaction instrument may communicate, to the merchant, information from one or more data sets associated with the financial transaction instrument. In one example, membership data and credit card data associated with a card are transmitted from a radio frequency FOB to a merchant interface "card reader" device. The merchant may complete the transaction using various techniques and practices now known or hereinafter developed wherein the merchant is compensated for the transaction by the user.

The system may be further configured such that, during this exemplary transaction, data sets associated with the financial transaction instrument may be managed. For example, the user may be prompted (e.g. on a screen by electronic voice, by a store clerk, and or the like) as to the possibility of adding, for example, a loyalty account to the same financial transaction instrument and the user may also be presented with terms and/or conditions. If the user accepts the invitation to add functionality to the financial transaction instrument, a new data set is added (step 130) and/or an existing data set is updated (step 140).

As used herein, the terms "user", "end user", "consumer", "customer" or "participant" may be used interchangeably with each other, and each shall mean any person, entity, machine, hardware, software and/or business. Furthermore, the terms "business" or "merchant" may be used interchangeably with each other and shall mean any person, entity, machine, hardware, software or business.

A financial transaction instrument may include one or more physical devices used in carrying out various financial transactions. For example, a financial transaction instrument may include a rewards card, charge card, credit card, debit card, prepaid card, telephone card, smart card, magnetic stripe card, radio frequency card and/or the like. In yet another exemplary embodiment of the present invention, a financial transaction instrument may be an electronic coupon, voucher, speed pass, and/or other such instrument.

The financial transaction instrument may be used to pay for acquisitions, obtain access, provide identification, pay an amount, receive payment, redeem reward points and/or the like. In the radio frequency ("RF") card embodiments, card to card transactions may also be performed. See, for example, Sony's "Near Field Communication" ("NFC") emerging standard which is touted as operating on 13.56 MHz and allowing the transfer of any kind of data between NFC enabled devices and across a distance of up to twenty centimeters. See also, Bluetooth chaotic network configurations; described in more detail at http://www.palowireless.com/infotooth/whatis.asp, which is incorporated herein by reference. Furthermore, data on a first RF FOB may be transmitted directly or indirectly to another RF FOB to create a copy of all or part of the original FOB.

Furthermore, financial transaction instruments may be associated with various applications which allow the financial transaction instruments to participate in various programs, such as, for example, loyalty programs. A loyalty program may include one or more loyalty accounts. Exemplary loyalty programs include frequent flyer miles, on-line points earned from viewing or purchasing products or websites on-line and programs associated with diner's cards, credit cards, debit cards, hotel cards, and/or the like. Generally, the user is both the owner of the transaction card account and the participant in the loyalty program; however, this association is not necessary. For example, a participant in a loyalty program may gift loyalty points to a user who pays for a purchase with his own transaction account, but uses the gifted loyalty points instead of paying the monetary value.

For more information on loyalty systems, transaction systems, and electronic commerce systems, see, for example, U.S. patent application Ser. No. 10/304,251, filed on Nov. 26, 2002 by inventors Antonucci et al. and entitled System and Method for Transfer of Loyalty Points; U.S. Continuation-In-Part patent application Ser. No. 10/378,456, filed on Mar. 3, 2003 by inventors Antonucci et al. and entitled System and Method for the Real-Time Transfer of Loyalty Points Between Accounts; U.S. patent application Ser. No. 09/836,213, filed on Apr. 17, 2001 by inventors Voltmer, et al. and entitled System And Method For Networked Loyalty Program; U.S. Continuation-In-Part patent application Ser. No. 10/027,984, filed on Dec. 20, 2001 by inventors Ariff, et al. and entitled System And Method For Networked Loyalty Program; U.S. Continuation-In-Part patent application Ser. No. 10/010,947, filed on Nov. 6, 2001 by inventors Haines, et al. and entitled System And Method For Networked Loyalty Program; U.S. Continuation-In-Part patent application Ser. No. 10/084,744, filed on Feb. 26, 2002 by inventors Bishop, et al. and entitled System And Method For Securing Data Through A PDA Portal; the Shop AMEX™ system as disclosed in Ser. No. 60/230,190, filed Sep. 5, 2000; the Loyalty As Currency™ and Loyalty Rewards Systems disclosed in Ser. No. 60/197,296 filed on Apr. 14, 2000, Ser. No. 60/200,492 filed Apr. 28, 2000, Ser. No. 60/201,114 filed May 2, 2000; a digital wallet system disclosed in U.S. Ser. No. 09/652,899 filed Aug. 31, 2000; a stored value card as disclosed in Ser. No. 09/241,188 filed on Feb. 1, 1999; a system for facilitating transactions using secondary transaction numbers disclosed in Ser. No. 09/800,461 filed on Mar. 7, 2001, and also in related provisional application Ser. No. 60/187,620 filed Mar. 7, 2000, Ser. No. 60/200,625 filed Apr. 28, 2000 and Ser. No. 60/213,323 filed May 22, 2000, all of which are herein incorporated by reference. Other examples of an online loyalty systems are disclosed in Netcentives U.S. Pat. No. 5,774,870, issued on Jun. 30, 1998, and U.S. Pat. No. 6,009,412, issued on Dec. 29, 1999, both of which are hereby incorporated by reference.

Furthermore, a "code", "account number", "identifier" or "loyalty number", as used herein, includes any device, code, or other identifier/indicia suitably configured to allow the consumer to interact or communicate with the system, such as, for example, authorization/access code, personal identification number (PIN), Internet code, other identification code, and/or the like that is optionally located on a rewards card, charge card, credit card, debit card, prepaid card, telephone card, smart card, magnetic stripe card, bar code card, radio frequency card and/or the like. The account number may be distributed and stored in any form of plastic, electronic, magnetic, radio frequency, audio and/or optical device capable of transmitting or downloading data from itself to a second device. A customer account number may be, for example, a sixteen-digit credit card number, although each credit provider has its own numbering system, such as the fifteen-digit numbering system used by an exemplary loyalty system. Each company's credit card numbers comply with that company's standardized format such that the company using a sixteen-digit format may generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer. In addition, loyalty account numbers of various types may be used.

In various exemplary embodiments, the financial transaction instrument may be embodied in other than a card like structure. As already mentioned, the financial transaction instrument may comprise an RF FOB, a speed pass, store discount card, or other similar device. Furthermore, the financial transaction instrument may be physically configured to have any decorative or fanciful shape including key chains, jewelry and/or the like. The financial transaction instrument may furthermore be associated with coupons.

As used herein, the term "data set" may include any set of financial transaction related information and/or the like. For example, data sets may include information related to credit cards, debit cards, membership clubs, loyalty programs, speed pass accounts, rental car memberships, frequent flyer programs, coupons, tickets and/or the like. This information may include account number(s), personal information, balances, past transaction details, cookies, and/or any other information. A data set may be associated with one or more account numbers. However, in other exemplary embodiments of the present invention, a data set may be unrelated to an account number. For example, a financial transaction instrument may comprise a card that has stored thereon a grocery store coupon data set. In this example, an account number is not necessarily used and mere possession of the card may be sufficient for use of the coupon data set to receive a discount on one or more items purchased from the participating grocery store.

Data sets associated with a financial transaction instrument may either be stored on the financial transaction instrument itself or remotely. In one exemplary embodiment, the financial transaction instrument itself is configured to store at least two data sets. In other exemplary embodiments, data sets may be stored in one or more databases and the data sets are affiliated with the financial transaction instrument. For example, a central database may store multiple data sets that may be accessed by the financial transaction instrument, the financial transaction instrument user, and/or the various accounts associated with the financial transaction instrument. In this example, the financial transaction instrument may include a single identifier, which is used to provide access to the central server containing the data sets associated with the financial transaction instrument.

Although all data sets associated with a particular financial transaction instrument may be owned by the same owner, it is contemplated that in general, some of the data sets stored on the financial transaction instrument have different owners. Furthermore, the storage of data sets is configured to facilitate independent management of the data sets on the financial transaction instrument by the various data set owners. The owners of data sets may include different individuals, entities, businesses, corporations, software, hardware, and/or the like. However, one skilled in the art will appreciate that the owners may also include different divisions or affiliates of the same corporation or entity.

A data set may contain any type of information stored in digital format. For example, a data set may include account numbers, programs/applications, scripts, cookies, instruments for accessing other data sets, and/or any other information.

As discussed above, many existing financial transaction instruments utilize pre-determined formats for account numbers, data and/or applications stored in association with the financial transaction instrument. Similarly, the data storage media associated with these financial transaction instruments are typically configured to accommodate specific pre-determined data formats. Thus, the combination of data sets associated with a single card can be a complex task when using existing methods because independent owners of data sets would generally need to conform their data set formats to a "standard format". In contrast to many existing financial transaction instruments, however, and in accordance with an exemplary embodiment of the present invention, the format of the information stored in the present invention may vary from one data set to another. Thus, each data set may be used for a very wide variety of purposes including storage of applications, raw data, cookies, coupons, membership data, account balances, loyalty information, and/or the like.

In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g.; paged memory, least recently used, etc.). By using BLOB methods, the ability to store various data sets that have different formats facilitates the storage of data associated with the financial transaction instrument by multiple and unrelated owners of the data sets. For example, a first data set may be stored by Bank A, a second data set may be stored by an unrelated credit card institution, and yet a third data set may be stored by an airline. Each of these three exemplary data sets may contain different information that is stored using different data storage formats and/or techniques.

As stated above, in various embodiments of the present invention, the data can be stored without regard to a common format. However, in one exemplary embodiment of the present invention, the data set (e.g., BLOB) is annotated in a standard manner. The annotation may comprise a short header, trailer, or other appropriate indicator related to each data set that is configured to convey information useful in managing the various data sets. For example, the annotation may comprise an indication of the status of the data set. In one example, the first three bytes of each data set BLOB may be configured or configurable to indicate the status of that particular data set; e.g., LOADED, INITIALIZED, READY, BLOCKED, REMOVABLE, or DELETED. Each of these status annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets. Furthermore, the security information may restrict/permit only certain actions such as accessing, modifying, and/or deleting data sets. In one example, the data set annotation indicates that only the data set owner or the user are permitted to delete a data set, various identified merchants are permitted to access the data set for reading, and others are excluded from accessing the data set. However, other access restriction parameters may also be used allowing various entities to access a data set with various permission levels as appropriate.

Figure 2:
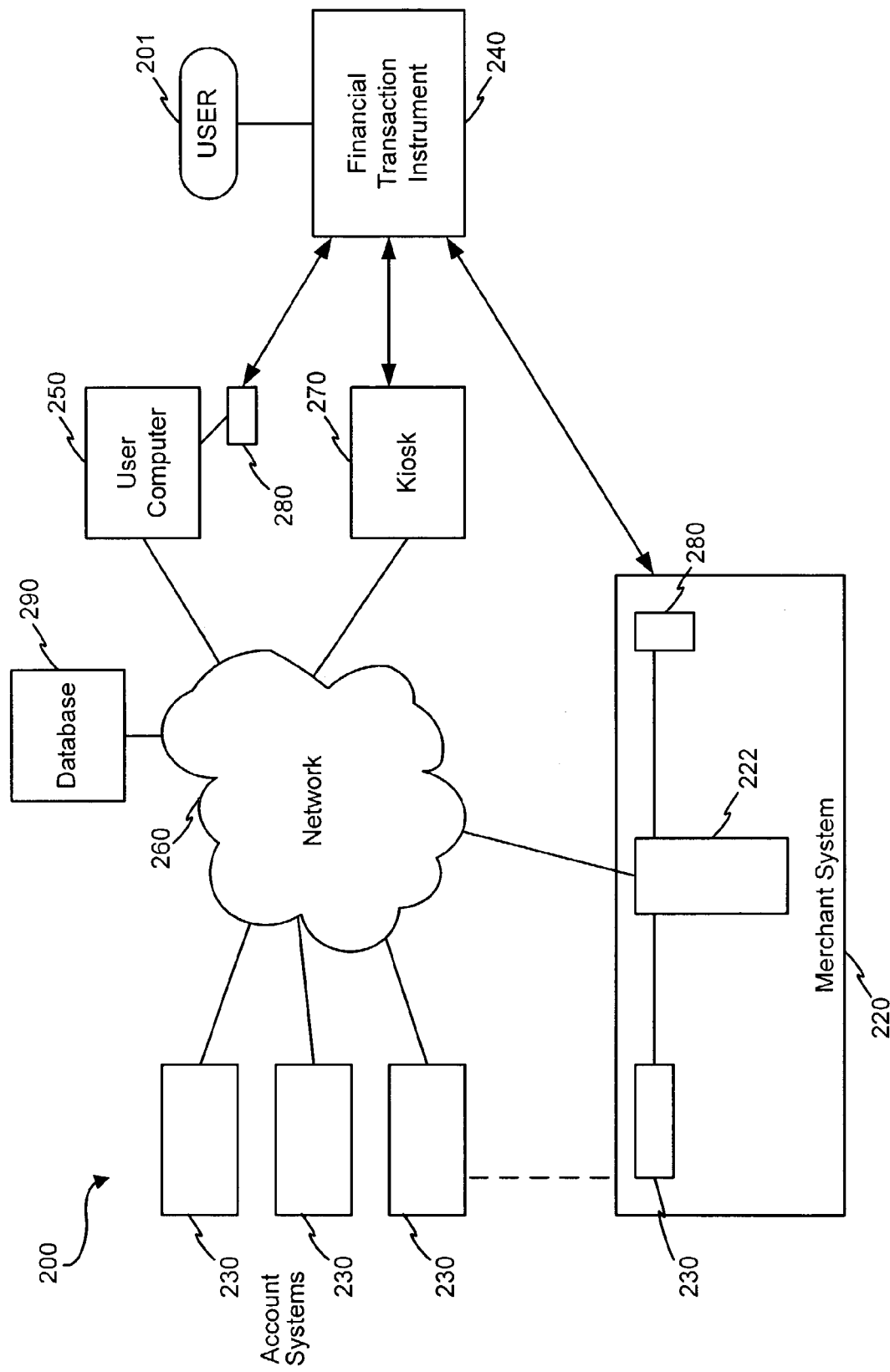
FIG. 2 illustrates a block diagram overview of an exemplary data set management system in accordance with an exemplary embodiment of the present invention.

With reference now to FIG. 2, in one exemplary embodiment of the present invention, a data set management system ("management system") 200 comprises a merchant system 220, various account systems 230, and a financial transaction instrument 240. Management system 200 may further be accessed by a user on a user computer 250 or via a kiosk 270. In these examples, communications between user computer 250 or kiosk 270 and merchant system 220 or account systems 230 may take place via, for example, a network 260. In various embodiments, merchant system 220, user computer 250 and/or kiosk 270 are configured to communicate with financial transaction instrument 240. For example, communication with the financial transaction instrument may be facilitated by a point of interaction device 280.

The systems and/or components of the systems discussed herein may also include one or more host servers or other computing systems including a processor configured to process digital data, a memory coupled to the processor for storing digital data, an input digitizer coupled to the processor for inputting digital data, an application program stored in the memory and accessible by the processor for directing processing of digital data by the processor, a display coupled to the processor and memory for displaying information derived from digital data processed by the processor and a plurality of databases, the databases including client data, merchant data, financial institution data and/or like data that could be used in association with the present invention. As those skilled in the art may appreciate, the user computer may typically include an operating system (e.g., Windows NT, 95/98/2000, Linux, Solaris, etc.) as well as various conventional support software and drivers typically associated with computers. The user computer can be in a home or business environment with access to a network. In an exemplary embodiment, access is through the Internet through a commercially-available web-browser software package.

In general, merchant system 220 is configured to interact with a user 201 making an acquisition and to communicate transaction data to one or more of account systems 230. Account systems 230 are configured to interact with financial transaction instrument 240 to exchange data facilitating a transaction. Merchant system 220 may be operated, controlled and/or facilitated by any merchant that accepts payment via a transaction card for an acquisition. The merchant may be any person, entity, software and/or hardware that is a provider, broker and/or any other entity in the distribution chain of goods or services. For example, the merchant may be a ticket/event agency (e.g., Ticketmaster, Telecharge, Clear Channel, brokers, agents).

Merchant system 220 is configured to facilitate interaction with user 201, which may be any person, entity, software and/or hardware. The user may communicate with the merchant in person (e.g., at the box office), or electronically (e.g., from a user computer 250 via internet 260). During the interaction, the merchant may offer goods and/or services to the user. The merchant may also offer the user the option of paying for the acquisition using a financial transaction instrument.

Communication between the user and/or merchant and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art may also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

Merchant system 220 may include a computer 222 that may provide a suitable website or other Internet-based graphical user interface that is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and/or the like.

It may be appreciated that many applications of the present invention could be formulated. One skilled in the art may appreciate that a network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm PILOT®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it may be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the internet, whereas the bank computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The systems may be suitably coupled to the network via data links. A variety of conventional communications media and protocols may be used for data links. For example, a connection to an Internet Service Provider (ISP) over the local loop as is typically used in connection with standard modem communication, cable modem, Dish networks, ISDN, Digital Subscriber Line (DSL), or various wireless communication methods. The merchant system might also reside within a local area network (LAN) that interfaces to the network via a leased line (T1, D3, etc.). Such communication methods are well known in the art and are covered in a variety of standard texts. See, e.g., GILBERT HELD, UNDERSTANDING DATA COMMUNICATIONS (1996), hereby incorporated by reference.

Each user may be equipped with a computing system to facilitate online commerce transactions. For example, the user may have a computing unit in the form of a personal computer, although other types of computing units may be used including laptops, notebooks, hand held computers, set-top boxes, and/or the like. The merchant has a computing unit implemented in the form of a computer-server, although other implementations are possible. The bank (transaction account) may have a computing center such as a main frame computer. However, the bank computing center may be implemented in other forms, such as a mini-computer, a PC server, a network set of computers, or the like.

Merchant system 220 may be configured to charge a transaction card account for the transaction. Any known or new methods and/or systems configured to charge the transaction card account may be used. In various exemplary embodiments of the present invention, one or more transaction card accounts may be used to initially pay for an acquisition. The acquisition may be only partially paid for using the transaction card account(s), for example, cash may be paid for part of an acquisition and the transaction card account may be used for the rest of the acquisition.

In addition, merchant system 220 may be configured to add, modify, and/or delete a data set on financial transaction instrument 240. A merchant may modify a data set as the owner of an account system. For example, the merchant may modify the terms and/or applications associated with its loyalty program and cause the financial transaction instrument's to be updated (i.e., modify the data set(s) associated with the loyalty program) when next presented. Furthermore, one or more data sets may be modified (by the merchant directly, or indirectly through one of the account systems 230) as payment for the acquisition. In one embodiment, a merchant is fully reimbursed, for the charge associated with the acquisition, by coupon points from a coupon data set on financial transaction instrument 240. In another example, the merchant is reimbursed to the extent that phone minutes remain on the financial transaction instrument in a "phone card" data set and the remainder of the transaction is charged to a transaction card account.

In one embodiment, an electronic commerce system may be implemented at the customer/user and issuing bank. For example, the electronic commerce system is implemented as computer software modules loaded onto the customer computer and the banking computing center. In this example, the merchant computer includes little or no additional software to participate in the online commerce transactions supported by the online commerce system. User computer 250 may be configured to interact with financial transaction instrument 240 to read, add, delete, and/or modify the data sets on the instrument. Furthermore, user 201 may self manage data via any of the following: merchant system 220, personal computer 250, kiosk 270, and/or the like. In one example of self management, a user logs onto a website and selects options for configuring data sets on a financial transaction instrument and the changes are transmitted to the user's card via a device 280 configured to communicate the data to instrument 240.

In one exemplary on-line embodiment, the user may self manage by selecting a web object such as a check box, radial button, or pull down menu option. For example, the user may select accounts to add to the instrument from a pull down menu that contains available financial product options. In another example, a point-of-sale machine may be configured to allow the input of a code, or an answer to a prompt that causes the new functionality or data sets to be added to a financial transaction instrument. For example, a POI device may be programmed to search the financial transaction instrument for a data set containing a particular club membership data set. If no data set is found, the POI device may alert the user or prompt the merchant to alert the user of the possibility of adding the membership to the financial transaction instrument. A positive response to this alert may cause the POI device to add a membership data set to the instrument. It is noted that the user may already be a member and the user is only adding the membership data set to the user's card. Alternatively, the user may become a member as the membership information is added to the financial transaction instrument. Furthermore, a user may subsequently personalize the membership data set online via a call center, or at a kiosk. In some embodiments, changes made to membership information may be updated to the financial transaction instrument the next time the user presents the financial transaction instrument to interact with a POI device.

Merchant server 222 may be configured to communicate the transaction data to the appropriate account systems 230, for example, in real-time or by using a "batch" process at the end of each day. Any suitable means of delivering the transaction data to account systems 230 may be used. In one exemplary embodiment of the present invention, the transaction data is delivered via internet 260.

Although various embodiments described herein include the storage of data sets on the financial transaction instrument itself, in accordance with another exemplary embodiment data sets may be stored on a database 290, remote from the financial transaction instrument. In one example, database 290 stores the data sets which may be managed as described herein. Furthermore, the financial transaction instrument is associated with the stored data sets (e.g. via an identification number) and when the user presents the financial transaction instrument, the appropriate data sets may be accessed by the merchant, kiosk, and/or the like.

In another exemplary embodiment, database 290 serves as a temporary or redundant storage space for data sets. Thus, an "image" of the data sets currently on the financial transaction instrument may be maintained and/or updated at appropriate intervals for facilitating replacement of, for example, a damaged financial transaction instrument. Also, changes to one or more data sets may be stored to database 290 pending an opportunity to update the financial transaction instrument. In various embodiments, such updating may take place in both directions similar to hot sync technology.

A database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. A database may be organized in any suitable manner, including as data tables or lookup tables. Association of certain data may be accomplished through any data association technique known and/or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Account systems 230 are also configured to interact with financial transaction instrument 240, directly or indirectly via database 290, to individually manage data sets on financial transaction instrument 240. For example, account systems 230 may manage data sets on database 290. In some embodiments, the data sets on database 290 may then be stored on financial transaction instrument 240 when it is presented. In other embodiments, account systems 230 may store data set information within their own systems which may communicate with the financial transaction instrument via user computer 250, kiosk 270, or merchant system 220. In such embodiments, the account system is configured to push the data set to the financial transaction instrument, or the merchant, kiosk or computer may be configured to pull such information from the account systems.

User 201 and/or the owner of the data sets associated with account systems 230 may manage data sets on financial transaction instrument 240. In various exemplary embodiments, financial transaction instrument 240 may be configured to communicate with merchant system 220, account systems 230, or user computer 250. Each account system 230 may also be configured to generate bills to user 201 (showing charges and/or credits as applicable) and/or to pay the merchant for acquisitions charged to the transaction card account. Account systems 230 is any person, entity, hardware and/or software that may be configured to facilitate managing data sets on a financial transaction instrument. Account systems 230 may represent many types of card issuing institutions, such as credit card companies, card sponsoring companies, or third party issuers under contract with financial institutions. It is further noted that account systems 230 may also represent other non-account and non-card type transaction institutions.

In another exemplary embodiment of the present invention, merchant system 220, kiosk 270, and/or user computer 250 may be configured to interact with financial transaction instrument 240 via an interaction device 280. Interaction device 280 may be any device configured to communicate with financial transaction 240. In one embodiment, interaction device 280 is configured to read and write to financial transaction instrument 240. For example, interaction device 280 may be a point of interaction magnetic card reader/writer. In another example, interaction device 280 is a transponder. Interaction device 280 may be configured to select data sets for use by a merchant using any suitable selection technique including but not limited to proprietary commands or command sequences or use of ISO/IEC 7816-4 application selection sequences, e.g., GET command.

In one exemplary embodiment, management of data sets is facilitated by annotating the data set with a status indicator; e.g., LOADED, INITIALIZED, READY, BLOCKED, REMOVABLE or DELETED.

In this regard, a data set may have a LOADED status when the information related to that data set has been stored in association with the financial transaction instrument, but remains dormant. For example, a credit card account may have been added to the financial transaction instrument that has not yet been activated. In some instances, the loaded data set needs to be further configured before it is ready to be used. For example, the data set may be modified to include a particular branch of in a chain of franchise stores, the identification of a user's primary care physician, or to reflect an user's selection of a platinum membership status. In another example, a loyalty program may be added in association with a financial transaction instrument, and the data set marked LOADED. In another example, the user may interact with a kiosk or the like to input personal information and configure the loyalty program data set. Once such a data set has been configured, it may be annotated with an INITIALIZED status.

The status of a data set may be set as READY when the data set is ready to be utilized. For example, a user may enter a secret code to indicate that the user is ready to use the data set. In one example, the data set may be marked as READY when that data set is first accessed to perform a transaction. It will be noted that in accordance with other embodiments of the present invention, the status of a data set may be set at READY the moment it is loaded to the financial transaction instrument. Furthermore, it is possible to change the status between READY, LOADED, and INITIALIZED, under appropriate circumstances. Thus, the data sets may be managed through any one or more of these states and in various orders.

It may also be desirable to prevent use of a data set and/or the associated functionality for a period of time. Thus, the status indicator may be set to BLOCKED. The setting of the status indicator to BLOCKED may, for example, disable the use of the data set. In one exemplary embodiment, an appropriately configured financial transaction instrument reader is configured to recognize the BLOCKED status indicator when accessing the data set and to prevent use of that data set example.

In addition, for various reasons, a user may desire to remove a data set from a transaction card. The user may, for example, desire to use the available space on the transaction card for other data sets, or may remove the data set for security reasons. Furthermore, circumstances may arise where the owner of the data set desires to remove the data set from one or more transaction devices, such as when a coupon expires. In these instances, the data set may be marked as REMOVABLE. Under these circumstances, the memory associated with the data set is available to receive information associated with future added data sets, but for the moment retains the old data set. A REMOVABLE data set may again be made READY under various configurations.

The REMOVABLE data set may subsequently be removed from the financial transaction instrument and marked DELETED. A DELETED status indicator may be used to indicate that a portion of the financial transaction instrument is available to store one or more data sets. It is noted that data sets may be directly deleted without going through the step of making the data set REMOVABLE. In one example, a data set may be removed from the financial transaction instrument if the security of the account associated with the data set is compromised (e.g., stolen password). Furthermore, as appropriate, the status of data sets may be changed to different states. Under appropriate circumstances one or more of any of the six status indicators LOADED, INITIALIZED, READY, BLOCKED, REMOVABLE, or DELETED or other suitable status indicators may be used to annotate a BLOB or other similar data set.

Although the data sets described herein may be managed without status indicators, nevertheless, such status indicators facilitate management of data. For example, regardless of a first data set owner's ability to interpret the information stored in a data set owned by another party, the first owner may interpret the status indicator to determine whether the data set is LOADED, DELETED, or the like. The determination that a data set is DELETED facilitates the addition of new data sets by independent owners without overwriting other data sets on the financial transaction instrument. In addition, the use of tags or status indicators may facilitate the use of global rules, which may simplify operations and/or commands. Status indicators may also enhance interoperability between data sets. Nevertheless, a data set owner may chose not to use a status indicator even if the opportunity is available.

Figure 3:
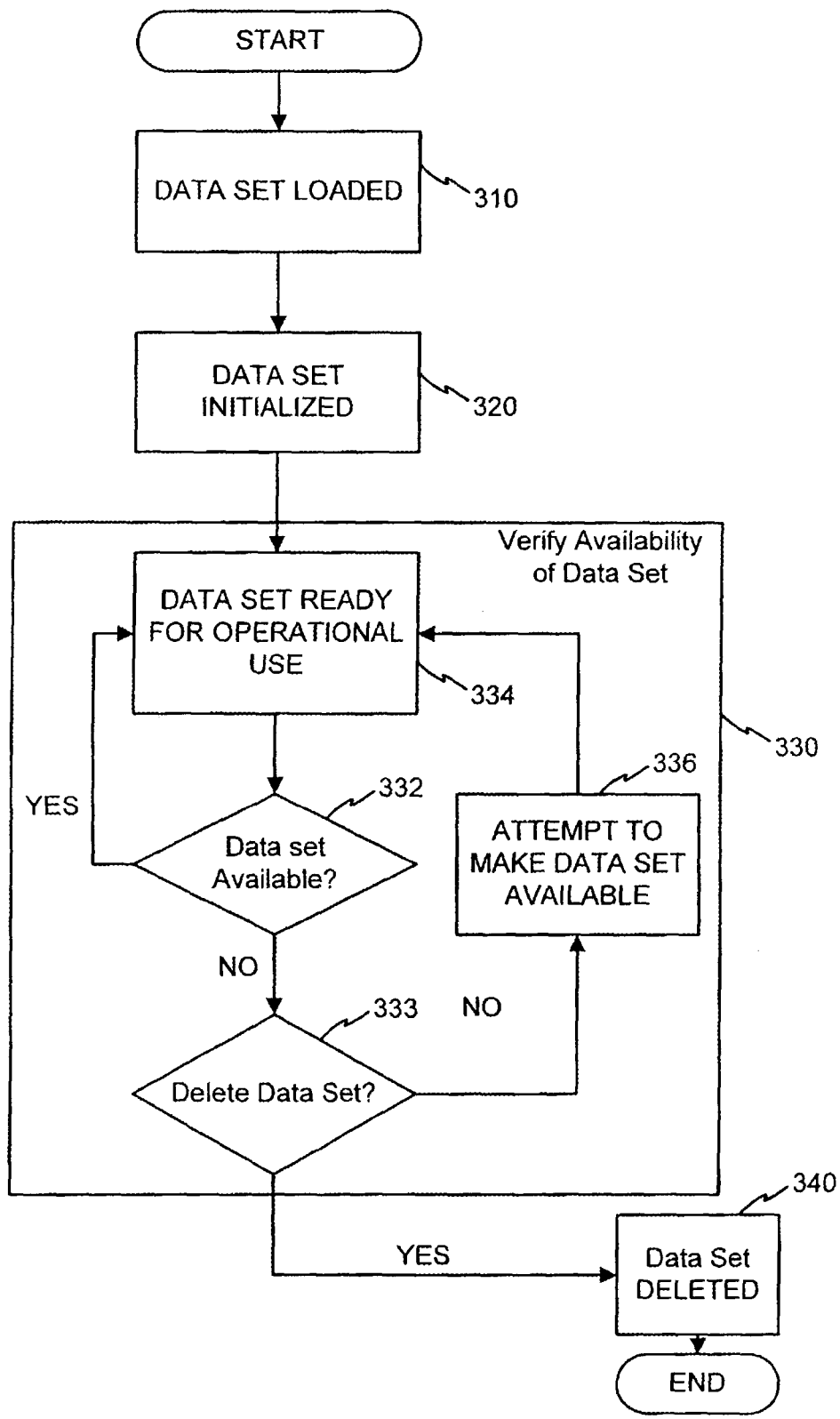
FIG. 3 illustrates a more detailed exemplary data set management method in accordance with an exemplary embodiment of the present invention.

Managing of the data sets (step 120) may include one or more of the following exemplary steps: add, update, modify, replace, verify, delete and/or the like. More particularly, FIG. 3 illustrates a general overview of an exemplary data set management method 300 comprising the steps of: loading a data set (step 310), initializing a data set (step 320), verifying availability of data set (step 330), and deleting a data set (step 340). In this manner, a data set may be added to a financial transaction instrument and utilized until it is deleted. The adding and deleting steps are described in further detail with reference to FIGS. 4 and 5. Furthermore, the ability to update, modify, replace and/or delete a data set may be subject to security requirements.

In one embodiment, the various processes may include a user facilitating the input of information into a data management system to cause the data set to be loaded. The information may be inputted via keypad, magnetic stripe, smart card, electronic pointer, touchpad and/or the like, into a user computer, POS terminal, kiosk, ATM terminal and/or directly into the merchant system 220 via a similar terminal or computer associated with merchant server 222. The information may be transmitted via any network 260 discussed herein to merchant system 220 or account systems 230. In another embodiment, the merchant may enter the information into an account system 230 on behalf to the user. This may occur, for example, when the user authorizes the management of data sets on financial transaction instrument 240 over a telephone and the service representative inputs the information. In this embodiment, the financial transaction instrument may be updated at the next presentment opportunity.

Any suitable procedures may be utilized to determine whether a data set is currently ready for use and available (step 330). In one example, when a financial transaction instrument is presented, the availability of the data set is verified by checking whether the data set has been corrupted or blocked (step 332), or deleted (step 333). If the answer to these questions is no, then the data set is available and ready for use (step 334). If the data is corrupted or blocked, subroutines may be used to attempt to retry reading the data (step 336). If the data set is marked deleted or removable, subroutines will prevent access to the data set (step 333) and remove the data set (step 340).

Figure 4:
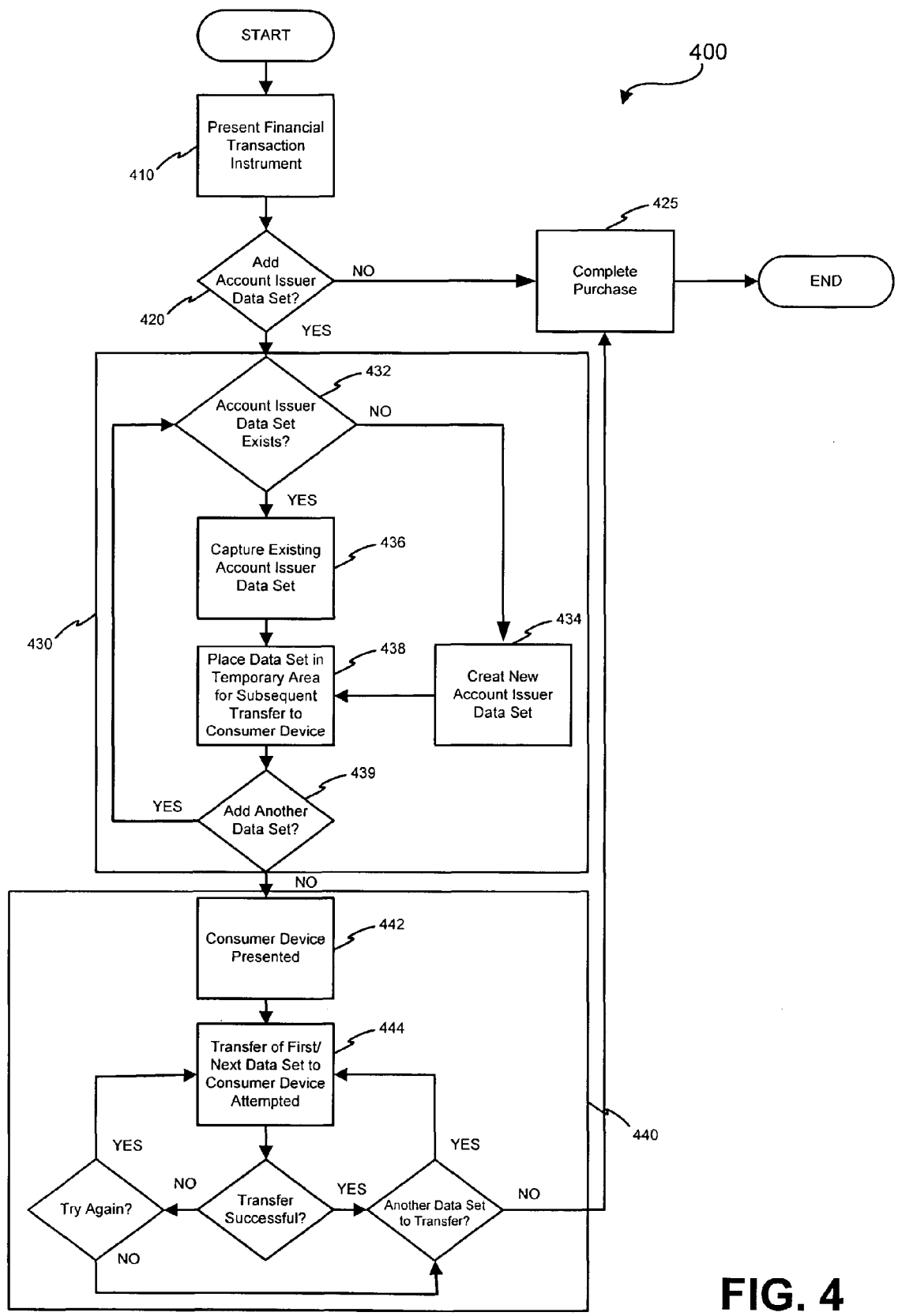
FIG. 4 illustrates an exemplary data set management method for adding data sets in accordance with an exemplary embodiment of the present invention.

Various methods may be used to add a data set to a financial transaction instrument or to replace a data set on a financial transaction instrument. FIG. 4 illustrates an exemplary method of adding a data set to a financial transaction instrument, including the general steps of presenting the financial transaction instrument (step 410), verifying the addition of the data set to the financial transaction instrument (step 420), placing the data set in a temporary holding area (step 430), and adding the data set (step 440).

More particularly, the user presents the financial transaction instrument (step 410) to a device 280 configured to communicate with instrument 240. The user may present financial transaction instrument 240 at a point of purchase. For example, the user may swipe a transaction card at a Point Of Interaction machine in a retail store. Alternatively, the user may present the financial transaction instrument at a self-service location such as a kiosk in a mall. Moreover, the user may present the financial transaction instrument to a peripheral device associated with a personal computer, or the like.

The user is then given the opportunity to add a data set to the transaction card. For example, device 280 may detect the absence of a particular data set on the card and prompt the user to confirm the addition of this data set to the card (step 420). In one example, when a user presents a financial transaction instrument to a merchant, the card reader detects the absence of a loyalty data set and provides a message on a display to the user or the store clerk indicating that the loyalty data set can be added if desired. The user may answer no and complete the purchase using typical transaction methods (step 425). Alternatively, if user 201 provides an affirmative response, the algorithm may prepare a data set for communication with the financial transaction instrument (step 430). The process may determine whether the data set (or information that could be used to create the data set) exists in some form or on some device other than on the financial transaction instrument (step 432). Determining whether a data set exists may involve querying an account system 230, database 290, or the like. Determining whether a data set exists may also take place when a store clerk verbally asks (or a screen prompts) the user to present another card containing the information. For example, the data set may exist on a movie rental card and stored in magnetic stripe form, bar code, and/or the like.

If the data set exists in an accessible form, the data set may be captured (step 436). In this example, the user may present the movie rental card and the data read from the movie rental card may then be stored in a data set associated with the financial transaction instrument. For example, the user may desire to add a shopping loyalty card to the user's financial transaction instrument. The user may swipe, scan or otherwise present the loyalty card such that the data set from the loyalty card is captured. The system may be further configured such that the merchant, kiosk, or computer system may access an account system 230 to obtain information for creating the data set. Thus, if a user does not have the movie rental card on the user's person, the system may prompt the clerk to request identifying/security information and to access the user's account and therefore facilitate adding a movie rental data set associated with the user's financial transaction instrument. Any other suitable methods of capturing data sets may also be used.

If the data set does not exist, a new data set is created (step 434). Creation of the data set may, for example, involve filling out an application, providing name and address, creating an account, and/or the like. In either event, the pre-existing or newly created data set is temporarily held in a storage area (e.g., database 290, local memory or the like) for transfer to the financial transaction instrument (step 438). Additional data sets may be prepared for transmittal to financial transaction instrument 240 (step 439).

In this exemplary embodiment, the consumer device is presented again to interaction device 280 (step 442). Interaction device 280 is configured to attempt to transfer the data set(s) to the financial transaction instrument (step 444). For example, existing interaction device 280 may be configured with software and/or hardware upgrades to transmit data to the financial transaction instrument. In one exemplary embodiment, if the data sets were not transferred correctly, the process may try the transfer again. In another exemplary embodiment, data sets are added one at a time or altogether. Thus, a user may pass a card through a card reader/writer one or more times during the addition process. The purchase may be completed (step 425) using the new data set or another selected method of payment. The same steps may be used in a self service embodiment, however, in one embodiment, no financial transaction takes place along with the addition of data sets. It should also be noted that under appropriate circumstances, a user could add data sets at a point of purchase without actually completing a purchase.

In various exemplary embodiments, the user and/or the owner of the data set may manage the data set (i.e., steps 432-439) in advance of presenting the financial transaction instrument. For example, a user on user computer 250 may choose to add or delete data sets via a website configured for management of data sets. In another example, a credit card company may add functionality to an account and may desire to update the data set associated with that account. In either example, data sets that have been prepared in advance, may be ready for transmission upon presentment of the financial transaction instrument. The transmission of the data sets may be transparent to the user. For example, the user may present the financial transaction instrument (step 442) to complete a purchase and the waiting data sets may automatically be added to the users card (step 440).

Similar steps may be taken to replace or update data sets with new information. For example, a user at a point of interaction may be informed of an upgrade in functionality associated with an account or other data set. Following similar steps as discussed with reference to FIG. 4, the existing data set on the financial transaction instrument is replaced with a new data set. Moreover, depending on permission rights and/or hierarchies in place, if any, an existing data set may be replaced with an unrelated data set. Other methods of adding and replacing data sets may also be used to manage data sets on a financial transaction instrument.

Figure 5:
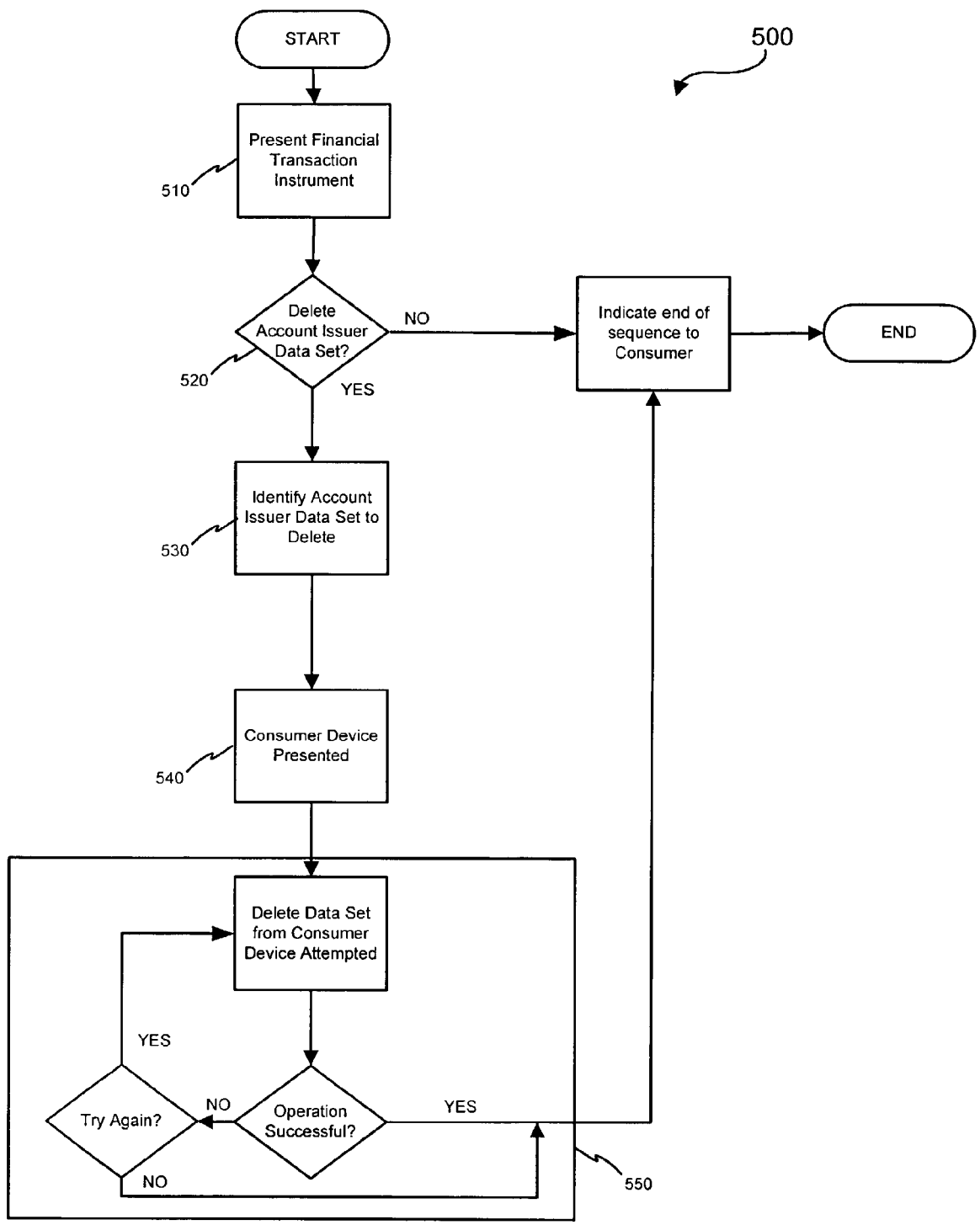
FIG. 5 illustrates an exemplary data set management method for deleting data sets in accordance with an exemplary embodiment of the present invention.

Furthermore, data sets may be deleted using any suitable techniques. For example, FIG. 5 illustrates an exemplary data set deletion method 500. The consumer presents financial transaction instrument 240 at a point of purchase, self-service location, or the like (step 510). The POS device may be configured to facilitate the user providing input regarding deletion of a data set (step 520). For example, the POS device may ask the user, via a test screen, whether the user desires to manage the data sets on the financial transaction instrument. Through a series of menus and/or questions, the user may identify data sets that the user desires to delete.

Furthermore, the POS device may be configured to interrogate a database 290 or specific account systems 230 to determine whether the deletion of a data set has been requested earlier. If the user requests deletion of one or more data sets, the data sets are then identified (step 530). It will be noted that step 530 may occur concurrently with step 520 or the user may request deletion of a specific account at this step. In other embodiments, accounts may be deleted per predefined rules or policies, and/or the like. Upon presenting the financial transaction instrument again, the identified data set(s) are removed from the financial transaction instrument (steps 540 and 550). Other methods of deleting data sets may also be used to manage data sets on a financial transaction instrument.

In an exemplary embodiment, management of the data sets may further include selecting preferences for use of the data sets. For example, a user may indicate a desire to use data set A, associated with a low interest rate credit card, as a first option, but to use data set B, associated with a higher interest rate credit card when data set A is not available. In another example, one data set may be used for purchases of gas while another data set may be used for purchasing travel tickets. The consumer data set preferences may be stored on the financial transaction instrument as a data set. In this example, when the card is presented, all available data sets are read and the card reader device determines which data sets are to be used based in part on the preferences stored on the card, which preferences may be updated from time to time.

In one exemplary embodiment of the present invention, financial transaction instrument 240 is a FOB. The FOB may be configured to communicate via a radio frequency transponder to the merchant systems or account systems. In yet another embodiment, the FOB may be configured to comprise two or more antennae that are both configured to send and receive information. In this exemplary embodiment, each antenna may be configured to communicate using a particular protocol and/or frequency. Thus, the FOB may be configured to communicate with two or more interaction devices 280 that each communicate with the FOB using different transmission frequencies. For more information on dual antenna FOBs, see U.S. patent application Ser. No. 10/192,488, filed Jul. 9, 2002 by inventors Michael J. Berardi, et al. and entitled System and Method for Payment Using Radio Frequency Identification in Contact and Contactless Transactions, which is hereby incorporated by reference.

The present invention may be described herein in terms of functional block components, optional selections and/or various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and/or the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and/or the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by Mayiam Stalling, published by Prentice Hall; all of which are hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. It should be noted that many alternative or additional functional relationships or physical connections may be present in a practical data set management system.

As may be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus include steps for implementing the functions specified in the flowchart block or blocks.

In the foregoing specification, the invention has been described with reference to specific embodiments. However, it may be appreciated that various modifications and changes can be made without departing from the scope of the present invention. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A computer implemented method comprising:
associating, by a computer-based system for managing data sets stored on a financial transaction instrument and a first owner, a first data set of a first format with the financial transaction instrument, wherein said first data set is owned by said first owner, before issuance of said financial transaction instrument;
associating, by said computer-based system and a second owner distinct from said first owner, a second data set of a second format different than said first format, with the financial transaction instrument, wherein said second data set is owned by said second owner, after issuance of said financial transaction instrument,
storing in a database, by said computer-based system, said first data set in accordance with said first format and said second data set in accordance with said second format on the financial transaction instrument,
associating, by said computer-based system, a status condition header configured to indicate the following status conditions: loaded, initialized, ready, blocked, removable, and deleted with at least one of said first data set and said second data set, said status condition header indicating a status condition of said at least one of said first data set and said second data set, said status indicator further indicating access levels for modifying, deleting and accessing said at least one data set; and
updating, by said computer-based system, said first data set and said second data set, wherein said updating of said first data set is based on said first owner, and said updating of said second data set is based on said second owner.

2. The method of claim 1, wherein said first owner comprises said issuer of the financial transaction instrument, and wherein said second owner comprises a merchant.

3. The method of claim 1, further comprising deleting, by said computer-based system and by said second owner, said second data set.

4. The method of claim 3, further comprising associating, by said computer-based system, a third data set with the financial transaction instrument, wherein said third data set is stored, at least partially, in at least a portion of the data storage space that was used to store said second data set.

5. The method of claim 4, wherein said financial transaction instrument is at least one of a smart card, a magnetic stripe card, and a transponder.

6. The method of claim 5, wherein said first data set and said second data set are stored as a first block of binary and a second block of binary, respectively.

7. The method of claim 6, further comprising deleting, by said computer-based system, said first data set from the financial transaction instrument.

8. The method of claim 7, wherein said first data set is stored in a first memory area, and wherein said first memory area is reusable by a third data set after said first data set is deleted from said first memory area.

9. A financial transaction instrument comprising:
a processor for managing data sets stored on said financial transaction instrument,
a tangible, non-transitory memory configured to communicate with the processor,
the tangible, non-transitory memory having instructions store thereon that, in response to execution by the processor, cause the processor to perform operations comprising:
storing, by said processor, a first data set of a first format and a second data set of a second format, said first format being different from said second format;
associating, by said processor and before issuance of said financial transaction instrument, said first data set with a first owner comprising an issuer of said financial transaction instrument and storing said first data set by said first owner independent of a second owner comprising a merchant;
associating, by said processor and after issuance of said financial transaction instrument, said second data set with said second owner and storing said second data set by said second owner independent of said first owner, said first owner being distinct from said second owner;
wherein said first data set and said second data set are updated, wherein said updating of said first data set is based on said first owner, and said updating of said second data set is based on said second owner;
associating, by said processor, a status condition header configured to indicate the following status conditions: loaded, initialized, ready, blocked, removable, and deleted with at least one of said first data set and said second data set, said status condition header indicating a status condition of said at least one of said first data set and said second data set, said status indicator further indicating access levels for modifying, deleting and accessing said at least one data set; and
communicating, by said processor and via at least one of a radio frequency transponder and a magnetic stripe, said first data set and said second data set to a processing entity in connection with a financial transaction.

10. The financial transaction instrument of claim 9, further comprising a first data storage area, wherein said first data storage area is configured to receive data in one or more formats, including said first format and said second format, corresponding respectively to said first data set and said second data set.

11. The financial transaction instrument of claim 10, wherein the financial transaction instrument is configured to receive operating power directly from an interrogation signal.

12. An article of manufacture including a non-transitory, tangible computer readable storage medium having instructions stored thereon that, in response to execution by a computer-based system for managing data sets stored on a financial transaction instrument, cause the computer-based system to perform operations comprising:
associating, by said computer-based system, said financial transaction instrument including at least one of a radio frequency transponder and a magnetic stripe configured to couple with a processing entity and communicate a portion of said first data set and said second data set to said processing entity in connection with a financial transaction, with a first data set of a first format and a second data set of a second format;
storing, by said computer-based system, said first data set in accordance with said first format in a memory on said financial transaction instrument and storing said second data set in accordance with said second format in said memory on said financial transaction instrument, said first format being different from said second format;

associating, by said computer-based system, said first data set with a first owner comprising said issuer of said financial transaction instrument before issuance of said financial transaction instrument and associating said second data set with a second owner comprising a merchant after issuance of said financial transaction instrument, said first owner being distinct from said second owner;

associating, by said computer-based system, a status condition header configured to indicate the following status conditions: loaded, initialized, ready, blocked, removable, and deleted with at least one of said first data set and said second data set, said status condition header indicating a status condition of said at least one of said first data set and said second data set, said status indicator further indicating access levels for modifying, deleting and accessing said at least one data set;

facilitating, by said computer-based system, updating said first data set and said second data set, wherein said updating of said first data set is based on said first owner, and said updating of said second data set is based on said second owner; and communicating, by said computer-based system, with an interaction device in said first format and said second format, corresponding respectively to said first data set and said second data set.

13. The article of manufacture of claim 12, wherein said first data set and said second data set are managed by at least one of a self service kiosk and a personal computer.

14. The article of manufacture of claim 13, wherein said financial transaction instrument is configured to perform the following management actions: adding, updating, and deleting said second data set.

15. The financial transaction instrument of claim 11, wherein said first data set and said second data set are associated with a first application and a second application, respectively, said first application being independent of said second application.

16. The financial transaction instrument of claim 9, wherein said first data set and said second data set are associated with a first application and a second application, respectively, said first application being independent of said second application.

17. The article of manufacture of claim 12, wherein said financial transaction instrument is configured to receive operating power directly from an interrogation signal.

18. The financial transaction instrument of claim 15, wherein said financial transaction instrument is configured to perform the following management actions: adding, updating, and deleting said second data set.

19. The financial transaction instrument of claim 18, wherein said first data set and said second data set are managed by at least one of a self service kiosk and a personal computer.

* * * * *